United States Patent
Wang et al.

(10) Patent No.: US 10,425,875 B2
(45) Date of Patent: Sep. 24, 2019

(54) NETWORK-SIDE DEVICE, USER EQUIPMENT, AND BLIND AREA MANAGEMENT METHOD

(71) Applicant: Huawei Technologies Co., Ltd., Shenzhen (CN)

(72) Inventors: Yi Wang, Shanghai (CN); Wen Tong, Ottawa (CA); Lei Huang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 103 days.

(21) Appl. No.: 15/621,127

(22) Filed: Jun. 13, 2017

(65) Prior Publication Data
US 2017/0280365 A1  Sep. 28, 2017

Related U.S. Application Data

(63) Continuation of application No. PCT/CN2015/095825, filed on Nov. 27, 2015.

(30) Foreign Application Priority Data

Dec. 18, 2014 (WO) ................ PCT/CN2014/094222

(51) Int. Cl.
*H04W 36/30* (2009.01)
*H04W 36/06* (2009.01)
(Continued)

(52) U.S. Cl.
CPC .......... *H04W 36/30* (2013.01); *H04B 7/0623* (2013.01); *H04B 7/0632* (2013.01);
(Continued)

(58) Field of Classification Search
None
See application file for complete search history.

(56) References Cited

U.S. PATENT DOCUMENTS

| 2004/0147264 A1 | 7/2004 | Ogawa |
| 2009/0046573 A1 | 2/2009 | Damnjanovic |

(Continued)

FOREIGN PATENT DOCUMENTS

| CN | 101137221 A | 3/2008 |
| CN | 101411228 A | 4/2009 |

(Continued)

OTHER PUBLICATIONS

Shokri-Ghadikolaei, H. et al., "Design Challenges of Millimeter Wave Communication: A MAC Layer Perspective," Article dated Mar. 2014, downloaded from research gate.net at https://www.researchgate.net/publication/260556752_Design_Challenges_of_Millimeter_Wave_Communications_A_MAC_Layer_Perspective on Aug. 18, 2017, 9 pages.

*Primary Examiner* — Charles C Jiang
*Assistant Examiner* — Saad Khawar
(74) *Attorney, Agent, or Firm* — Slater Matsil, LLP

(57) ABSTRACT

A network-side device, user equipment, and method for blind area management. The network-side device includes a receiving module configured to receive measurement information sent by user equipment, a processor, and a non-transitory computer-readable storage medium storing a program to be executed by the processor. The program includes instructions to identify a status of the user equipment according to the measurement information received from the user equipment, wherein the status of the user equipment is a normal communication state or a blind area state, and the blind area state includes at least one of a beam biased state, an interfered state, or a blocked state, and perform blind area management of the user equipment when the user equipment is in the blind area state.

26 Claims, 15 Drawing Sheets

(51) Int. Cl.
  *H04J 11/00* (2006.01)
  *H04W 8/24* (2009.01)
  *H04W 24/02* (2009.01)
  *H04W 36/00* (2009.01)
  *H04W 88/08* (2009.01)
  *H04B 7/06* (2006.01)
  *H04B 7/08* (2006.01)
  *H04L 1/00* (2006.01)
  *H04W 16/18* (2009.01)
  *H04W 48/12* (2009.01)

(52) U.S. Cl.
  CPC ............ *H04B 7/0695* (2013.01); *H04B 7/088* (2013.01); *H04J 11/0069* (2013.01); *H04L 1/00* (2013.01); *H04L 1/0001* (2013.01); *H04W 8/24* (2013.01); *H04W 24/02* (2013.01); *H04W 36/0055* (2013.01); *H04W 36/06* (2013.01); *H04W 88/08* (2013.01); *H04W 16/18* (2013.01); *H04W 48/12* (2013.01)

(56) References Cited

U.S. PATENT DOCUMENTS

| | | | |
|---|---|---|---|
| 2010/0178924 A1 | 7/2010 | Kashiwase | |
| 2010/0291931 A1* | 11/2010 | Suemitsu | H04W 36/245 455/436 |
| 2011/0158110 A1 | 6/2011 | Stacey et al. | |
| 2011/0207485 A1 | 8/2011 | Dimou et al. | |
| 2012/0092217 A1 | 4/2012 | Hosoya et al. | |
| 2012/0320874 A1 | 12/2012 | Li et al. | |
| 2013/0088983 A1 | 4/2013 | Pragada | |
| 2013/0155847 A1* | 6/2013 | Li | H04W 24/04 370/225 |
| 2014/0011445 A1 | 1/2014 | Trainin et al. | |
| 2014/0218236 A1* | 8/2014 | Sadeghi | H04W 16/28 342/367 |
| 2014/0321282 A1 | 10/2014 | Pragada et al. | |
| 2014/0370925 A1* | 12/2014 | Leiba | H04B 10/90 455/505 |
| 2015/0011218 A1* | 1/2015 | Lunden | H04W 40/16 455/436 |
| 2015/0146514 A1* | 5/2015 | Mahimkar | H04W 16/22 370/216 |
| 2017/0207828 A1 | 7/2017 | Jung et al. | |
| 2017/0332300 A1* | 11/2017 | Choi | H04W 36/00 |

FOREIGN PATENT DOCUMENTS

| | | |
|---|---|---|
| CN | 102111771 A | 6/2011 |
| CN | 102972066 A | 3/2013 |
| CN | 103596195 A | 2/2014 |
| CN | 103765792 A | 4/2014 |
| CN | 103843265 A | 6/2014 |
| CN | 104115419 A | 10/2014 |
| EP | 2214439 A1 | 8/2010 |
| EP | 2540109 A1 | 1/2013 |
| EP | 2648440 A1 | 10/2013 |
| JP | H08223110 | 8/1996 |
| JP | 2014204161 A | 10/2014 |
| JP | 2015500605 A | 1/2015 |
| KR | 20140113642 A | 9/2014 |
| KR | 20140129625 A | 11/2014 |
| WO | 2006106921 A1 | 10/2006 |
| WO | 2010143353 A1 | 12/2010 |
| WO | 2011102773 A1 | 8/2011 |
| WO | 2013086410 A2 | 6/2013 |
| WO | 2013126079 | 8/2013 |
| WO | 2013165149 A1 | 11/2013 |
| WO | 2014002946 A1 | 1/2014 |

\* cited by examiner

NETWORK-SIDE DEVICE, USER EQUIPMENT, AND BLIND AREA MANAGEMENT METHOD

CROSS-REFERENCE TO RELATED APPLICATIONS

This application is a continuation of International Application No. PCT/CN2015/095825, filed on Nov. 27, 2015, which claims priority of International Application No. PCT/CN2014/094222, filed on Dec. 18, 2014. The disclosures of the aforementioned applications are hereby incorporated by reference in their entireties.

TECHNICAL FIELD

The present application relates to the field of communications technologies, and in particular, to a network-side device, user equipment, and a blind area management method.

BACKGROUND

With continuous improvement of requirements on a data transmission rate, communication quality, and the like of mobile communications nowadays, existing frequency bands used for mobile communications have become extremely congested. However, in a millimeter-wave band of 6 GHz to 300 GHz, a large quantity of spectrum resources are still not allocated for use. Introducing a millimeter-wave band into cellular access communications to make full use of high-bandwidth resources of the millimeter-wave band is one of research interests of a next-generation mobile communications technology.

In existing researches, a high frequency band represented by a millimeter-wave band is mainly applied to an indoor short-range communications scenario. In an outdoor scenario, because of characteristics of complex terrain of the outdoor scenario, a relatively large path loss of the high frequency band, a weak capability to penetrate obstacles, severe rain fade at some frequency bands, and the like, application of the high frequency band in the outdoor scenario is severely restricted. However, due to a short wavelength of the high frequency band, it is easy to implement a large-scale array antenna by using the high frequency band, and an antenna gain may be improved by using a beam forming technology, so as to effectively compensate for the large path loss of the high frequency band. This also makes it possible to apply the high frequency band to intermediate-to-long distance transmission in the outdoor scenario.

For high-frequency communications, line-of-sight (LoS) transmission can reach a specific transmission range. However, for non-line-of-sight (NLoS) transmission, a current research achievement indicates that high frequency data transmission in a specific range can also be implemented by using a reflection path. However, in an actual network environment, a line-of-sight path or a reflection path is easily blocked by some objects, and a blind area is formed. Consequently, communication quality is affected.

SUMMARY

Embodiments of the present application provide a high-frequency communications system with relatively high communication quality and a blind area management method thereof.

A first aspect of the present application provides a network-side device, capable of performing data communication with user equipment by using a high frequency band, where the network-side device includes a receiving module, configured to receive measurement information sent by the user equipment, a determining module, configured to identify and determine a status of the user equipment according to the measurement information fed back by the user equipment, where the status of the user equipment is a normal communication state or different blind area states, and the different blind area states include a beam biased state, an interfered state, and a blocked state, and a blind area state processing module, configured to: start a quick beam search process when the status of the user equipment is the beam biased state, so as to find a new beam pair capable of converting the user equipment to the normal communication state; and convert the status of the user equipment to the blocked state if no new beam pair capable of converting the user equipment to the normal communication state is found within a preset time; where the blind area state processing module is further configured to: start an interference coordination process when the status of the user equipment is the interfered state, so as to schedule another high-frequency communication resource capable of reducing interference and converting the user equipment to the normal communication state; and convert the status of the user equipment to the blocked state if no high-frequency communication resource capable of converting the user equipment to the normal communication state is found within the preset time; and when the status of the user equipment is the blocked state, the blind area state processing module instructs the user equipment to break a high-frequency connection, so that the network-side device performs data communication with the user equipment by using a low frequency band.

A second aspect of the present application provides user equipment, capable of performing data communication with a network-side device by using a high frequency band or a low frequency band, where the user equipment includes a measurement information obtaining unit, configured to obtain channel measurement information that is obtained when the user equipment performs data communication with the network-side device, a determining unit, configured to identify and determine a status of the user equipment according to the measurement information, where the status of the user equipment is a normal communication state or different blind area states, and the different blind area states include a beam biased state, an interfered state, and a blocked state, a quick beam search and resource scheduling unit, configured to perform quick beam search when the user equipment is in the beam biased state, so as to find a new beam pair capable of converting the user equipment to the normal communication state; and further configured to start an interference coordination process when the user equipment is in the interfered state, so as to schedule a high-frequency communication resource capable of reducing interference and converting the user equipment to the normal communication state, a conversion unit, configured to: when the new beam pair converting the user equipment to the normal communication state is found within a preset time, convert the status of the user equipment from the beam biased state to the normal communication state, and when no new beam pair capable of converting the user equipment to the normal communication state is found within the preset time, convert the status of the user equipment from the beam biased state to the blocked state, where the conversion unit is further configured to: when the high-frequency communication resource capable of converting the user equipment to the normal communication state is found within the preset time, convert the status of the user equipment from the interfered state to the normal communication state, and when no high-frequency communication resource capable of converting the user equipment to the normal communication state is found within the preset time, convert the status of the user equipment from the interfered state to the blocked state, and a switching unit, configured to, when the user equipment is in the blocked state, break a high-frequency connection of the user equipment, and enable a low-frequency connection.

A third aspect of the present application provides a blind area management method, applied to a system capable of performing wireless communication by using a high frequency band, where the blind area management method includes receiving measurement information sent by user equipment, identifying and determining a status of the user equipment according to the measurement information fed back by the user equipment, where the status of the user equipment is a normal communication state or different blind area states, and the different blind area states include a beam biased state, an interfered state, and a blocked state. The method further includes starting a quick beam search process when the user equipment is in the beam biased state, so as to find a new beam pair capable of converting the user equipment to the normal communication state, or starting an interference coordination process when the status of the user equipment is the interfered state, so as to schedule another high-frequency communication resource capable of reducing interference and converting the user equipment to the normal communication state, and if the new beam pair capable of converting the user equipment to the normal communication state is found within a preset time, performing, by a network-side device and the user equipment, high-frequency data communication by using the new beam pair, and if no new beam pair capable of converting the user equipment to the normal communication state is found within the preset time, converting the status of the user equipment from the beam biased state to the blocked state, or if the high-frequency communication resource capable of converting the user equipment to the normal communication state is found within a preset time, performing, by a network-side device and the user equipment, high-frequency data communication by using the high-frequency communication resource, and if no high-frequency communication resource capable of converting the user equipment to the normal communication state is found within the preset time, converting the status of the user equipment from the interfered state to the blocked state. The method further includes, when the user equipment is in the blocked state, breaking, by the user equipment, a high-frequency connection, and enabling the network-side device to perform data communication with the user equipment by using a low frequency band.

A fourth aspect of the present application provides a blind area management method, applied to a system capable of performing wireless communication by using a high frequency band, where the blind area management method includes obtaining channel measurement information that is obtained when user equipment performs data communication with a network-side device, identifying and determining a status of the user equipment according to the measurement information, where the status of the user equipment is a normal communication state or different blind area states, and the different blind area states include a beam biased state, an interfered state, and a blocked state, when the user equipment is in the beam biased state, searching for, by means of quick beam search, a new beam pair capable of converting the user equipment to the normal communication state; or starting an interference coordination process when the user equipment is in the interfered state, so as to schedule a high-frequency communication resource capable of reducing interference and converting the user equipment to the normal communication state. The method further includes, if the new beam pair capable of converting the user equipment to the normal communication state is found within a preset time, converting the status of the user equipment from the beam biased state to the normal communication state, and if no new beam pair capable of converting the user equipment to the normal communication state is found within the preset time, converting the status of the user equipment from the beam biased state to the blocked state; or if the high-frequency communication resource capable of converting the user equipment to the normal communication state is found within a preset time, converting the status of the user equipment from the interfered state to the normal communication state, and if no high-frequency communication resource capable of converting the user equipment to the normal communication state is found within the preset time, converting the status of the user equipment from the interfered state to the blocked state. The method further includes, when the user equipment is in the blocked state, breaking a high-frequency connection of the user equipment, and enabling a low-frequency connection.

BRIEF DESCRIPTION OF THE DRAWINGS

To describe the technical solutions in the embodiments of the present application more clearly, the following briefly describes the accompanying drawings required for describing the embodiments.

DETAILED DESCRIPTION OF ILLUSTRATIVE EMBODIMENTS

The following clearly describes the technical solutions in the embodiments of the present application with reference to the accompanying drawings in the embodiments of the present application. Apparently, the described embodiments are a part rather than all of the embodiments of the present application. All other embodiments obtained by a person of ordinary skill in the art based on the embodiments of the present application without creative efforts shall fall within the protection scope of the present application.

It should be understood that the technical solutions of the embodiments of the present application may be applied to various communications systems, such as: a Global System for Mobile Communications (GSM) system, a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, an LTE time division duplex (TDD), a Universal Mobile Telecommunications System (UMTS), a Worldwide Interoperability for Microwave Access (WiMAX) communications system, a high-frequency communications system, or a future evolved PLMN (Public Land Mobile Network) network.

It should also be understood that in the embodiments of the present application, user equipment (UE) is referred to as a terminal, a mobile station (MS), a mobile terminal, and the like. The user equipment may communicate with one or more core networks by using a radio access network (RAN). For example, the user equipment may be a mobile phone (also referred to as a "cellular phone") or a computer with a mobile terminal. For example, the user equipment may alternatively be a portable, pocket-sized, handheld, computer built-in, or in-vehicle mobile apparatus, which exchanges voice and/or data with the radio access network.

A macro base station or a small cell mentioned in the embodiments of the present application may be a base transceiver station (BTS) in GSM or CDMA, may be a NodeB (NB) in WCDMA, or may be an evolved NodeB (eNB), in LTE. This is not limited in the present application.

Figure 1:
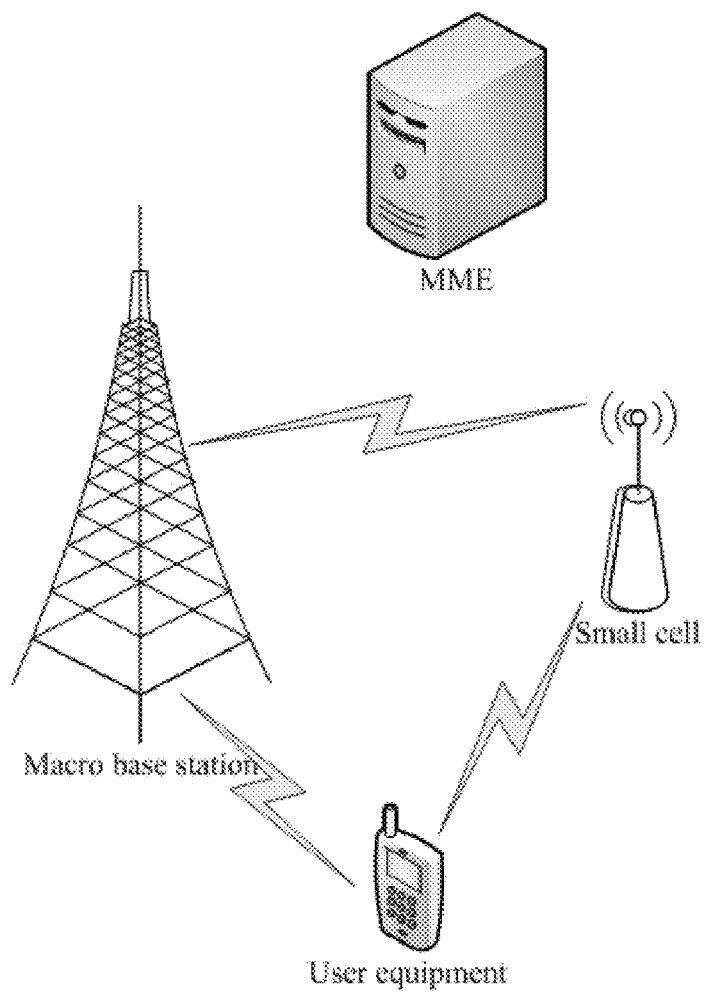
FIG. 1 is a schematic diagram of a communications system according to an embodiment of the present application.
Figure 2:
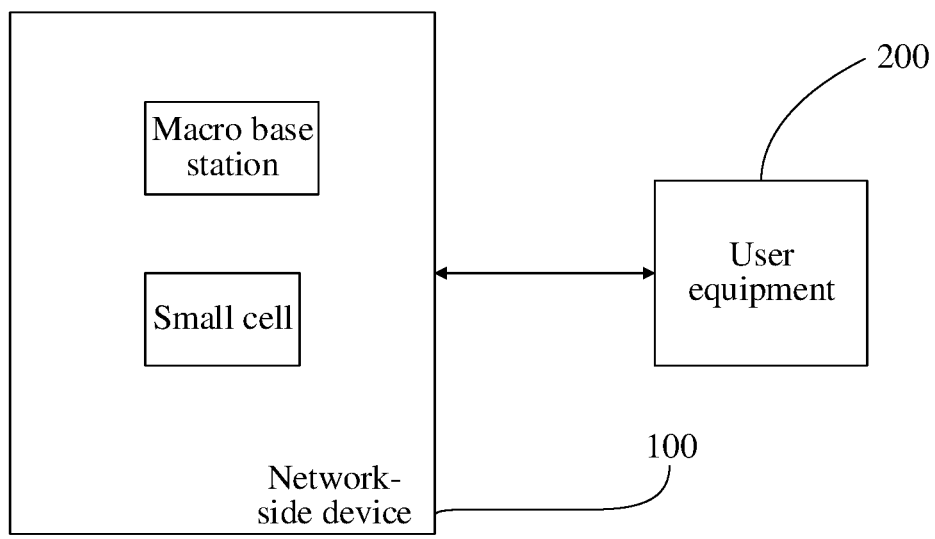
FIG. 2 is a composition diagram of a communications system according to an embodiment of the present application.

Referring to FIG. 1 and FIG. 2, an embodiment of the present application discloses a high-frequency communications system that includes a network-side device 100 and user equipment 200. In an implementation manner, the network-side device 100 may be a communications device including one or more of a small cell, a macro base station, or an MME (Mobility Management Entity). The small cell may be used as a serving base station of the user equipment 200, and transmits data to the user equipment by using a high frequency band (for example, a millimeter-wave band). Because of an attenuation feature of the high frequency band, a blind area problem probabilistically appears in the high-frequency communications system.

A blind area means that in coverage of a base station, due to obstacles or interference, or because beams are not completely aligned, or the like, strength of signals received by user equipment at some locations or a signal to interference plus noise ratio (SINR) is very low, and demodulation cannot be performed. There are mainly four following blind area scenarios:

A fully-blind scenario: All signals sent by a base station to user equipment are blocked, and RSRP (Reference Signal Received Power) received by the user equipment from a high-frequency base station is less than a smallest receive threshold. In this scenario, link quality cannot be improved by increasing transmit power or adjusting a direction of a beam between the base station and the user equipment, and a communication frequency band needs to be switched in time or another high frequency site needs to be reselected.

A beam biased scenario: Because of movement of user equipment or a change in an environment of surrounding reflectors, an originally matched beam is not adaptive any more, or specific signal strength can be obtained only by using a sidelobe beam. Even though the user equipment can also obtain, through demodulation, a lower-order modulated valid signal in this case, an optimal beam gain cannot be obtained, and a higher data transmission rate cannot be obtained in a higher-order modulation manner.

A backhaul interference scenario: User equipment is in an area interfered by a backhaul link signal. Consequently, when receiving a signal from a current base station, the user equipment is strongly interfered by the backhaul link signal. Therefore, a received SINR (Signal to Interference plus Noise Ratio) is very low and demodulation cannot be performed. That backhaul interference affects access communication of the user equipment increases as a site density and a beam quantity increase, and an increase in a quantity of reflectors also causes an increase in an interference probability.

An uplink-downlink asymmetry scenario: Asymmetry between uplink interference and downlink interference is caused because an uplink and a downlink are different in an antenna beam, transmit power, a used frequency, a topology, or the like.

For the foregoing blind area scenarios, four MAC layer state machines are introduced into the present application, and each state machine corresponds to a corresponding scenario. A base station and user equipment can correspondingly perform corresponding optimization operations on the MAC layer state machines according to statuses of the MAC layer state machines, so as to accelerate entering a normal communication state by the user equipment in a blind area.

Figure 3:
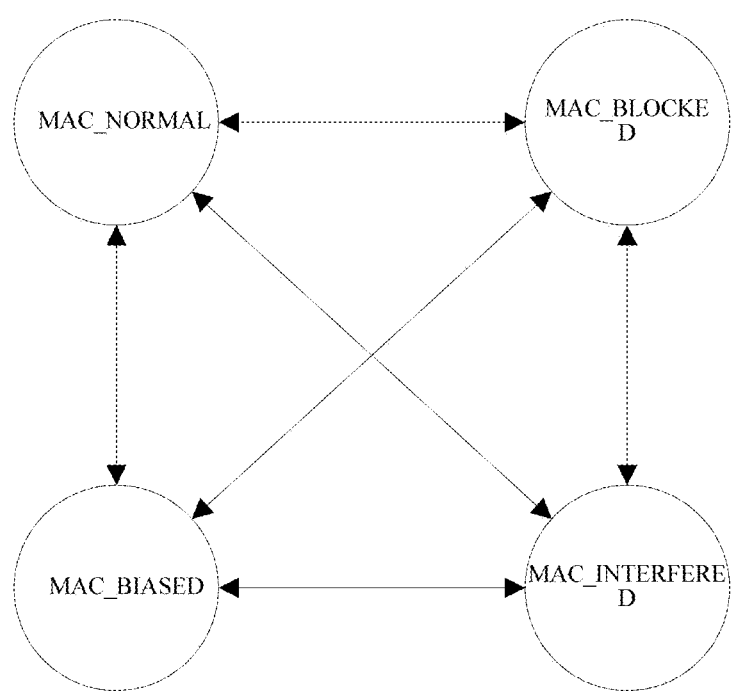
FIG. 3 is a diagram of conversion among four MAC states of user equipment at a high frequency according to an embodiment of the present application.

As shown in FIG. 3, four introduced MAC layer states are separately a normal communication state (MAC_NORMAL), a blocked state (MAC_BLOCKED), a beam biased state (MAC_BIASED), and an interfered state (MAC_INTERFERED). The MAC_NORMAL state indicates that user equipment is in a normal communication state, and may normally perform data communication with a base station. The MAC_BLOCKED state indicates that communication of user equipment is completely blocked and the user equipment cannot normally communicate with a base station, and the MAC_BLOCKED state corresponds to the foregoing fully-blind scenario. The MAC_BIASED state indicates that a user equipment beam is not aligned with a base station beam, and deterioration of link performance is caused, and the MAC_BIASED state corresponds to the foregoing beam biased scenario. The MAC_INTERFERED state indicates that normal communication of a user is affected because the user is strongly interfered, and the MAC_INTERFERED state corresponds to the foregoing backhaul interference scenario and the foregoing uplink-downlink asymmetry scenario. As shown in FIG. 3, the four states are mutually converted under a specific condition. An objective of designing the four states is to use different methods for users in different states by using identifications of the MAC states, so that the user equipment can be quickly converted from the three abnormal states MAC_BLOCKED, MAC_BIASED, and MAC_INTERFERED to the MAC_NORMAL state. Therefore, QoS (Quality of Service, quality of service) experience of the user is ensured.

Figure 4:
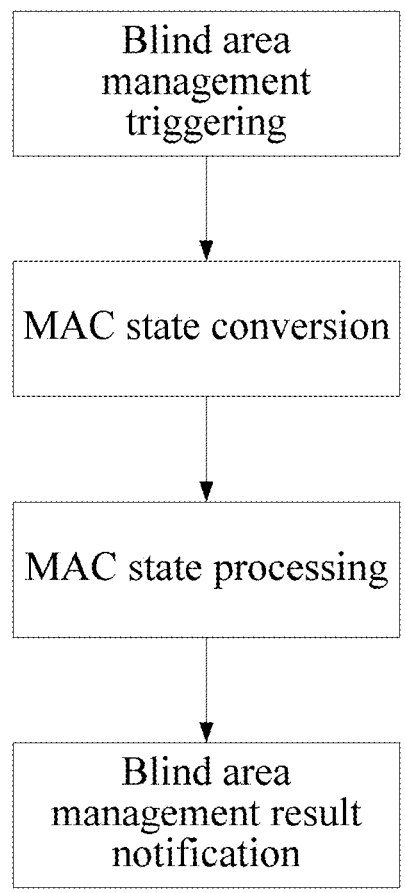
FIG. 4 is a flowchart of a blind area management method according to an embodiment of the present application.

Referring to FIG. 4, a blind area management method applied to the foregoing high-frequency communications system includes the following four processes.

A first process is a blind area management triggering process. A base station may trigger a blind area management process according to measurement statistics information on a base station side or measurement statistics information fed back by a user equipment side.

The base station may determine a downlink status according to uplink-downlink reciprocity by detecting uplink quality. For example, once an uplink RSRP (Reference Signal Received Power) value and an uplink RSRQ (Reference Signal Received Quality) value that are of user equipment and that are received by the base station are decreased to corresponding thresholds, blind area management is triggered.

Alternatively, the base station may determine a downlink status according to feedback information of the user equipment. For example, once the base station detects that same user equipment continuously loses an ACK (Acknowledgement) character multiple times (for example, three times), blind area management is triggered.

A second process is a MAC layer state determining process. The base station determines a MAC layer state of a user according to corresponding measurement information. The measurement information may include information such as RSRP, RSRQ, user location information, user movement speed, and an ACK/NACK.

For example, when an RSRP value received by the user equipment is greater than a preset receive threshold and an RSRQ value is less than a preset receive threshold, it may be determined that the user equipment is in a MAC_INTERFERED state. When the RSRP value of the user equipment is less than the preset receive threshold, and the movement speed is greater than a preset threshold, it may be determined that the user equipment is in a MAC_BIASED state.

After a timer of the user equipment in the MAC_INTERFERED state or the MAC_BIASED state times out, for example, by 100 transmission time intervals (Transmission Time Interval, TTI), it is determined that the user equipment is in a MAC_BLOCKED state.

When the user equipment in the MAC_BIASED state detects, in a time range of a timer by means of quick beam search, that RSRP values received on all beams are less than a preset receive threshold, it is determined that the user equipment is in a MAC_BLOCKED state.

When it is determined, by using the user location information, that a link between the user equipment and a serving base station of the user equipment is blocked, and consequently, the RSRP received by the user equipment is less than the preset receive threshold, it is determined that the user equipment is in a MAC_BLOCKED state.

A third process is a MAC layer state processing process. Corresponding processing is performed according to a MAC layer state of a user.

If the user equipment is in the MAC_BLOCKED state, a high-frequency connection of the user equipment is beaked, a related network entity such as an MME (Mobility Management Entity) is notified, and a high-low frequency switching process of the user equipment is started, so that the user equipment transmits data to the base station at a low frequency.

If the user equipment is in the MAC_BIASED state, the base station starts a quick beam search process. If a suitable matched beam is found in the time range of the timer, a MAC_BIASED state timer is disabled, and then a beam switching process is performed, so that the user equipment transmits high-frequency data to the base station by using the matched beam, and the status of the user equipment is converted to a MAC_NORMAL state. If it is detected, in the time range of the timer by means of quick beam search, that RSRP values received by the user equipment on all beams are less than the preset receive threshold or the timer times out, the status of the user equipment is converted to the MAC_BLOCKED state.

If the user equipment is in the MAC_INTERFERED state, the base station performs intra-station and inter-station interference coordination. In a range of a MAC_INTERFERED state timer, interference to a received signal of the user equipment is effectively reduced, that is, the RSRQ is improved to a normal working range. Therefore, the status of the user equipment is converted to the MAC_NORMAL state. When the MAC_INTERFERED state timer times out, and the interference to the received signal of the user equipment has not been reduced effectively, that is, the RSRQ still has not reached a normal range, the user equipment is converted to the MAC_BLOCKED state.

A fourth process is a blind area management result notification process. Corresponding user equipment or a corresponding network management entity is notified of a result obtained after MAC layer state processing is performed. For example, the user equipment needs to use a macro base station or the network management entity, to start a high-low frequency switching operation, and the user equipment needs to be instructed to break a high-frequency connection state and the like of the user equipment.

In the foregoing third process (the MAC layer state processing process), once the user is in the MAC_BIASED state, the quick beam search process is started. When initially accessing a high frequency system, the user equipment performs an initial synchronization and beam alignment operation with the high frequency system. In the operation, a high-frequency base station periodically sends corresponding synchronization information on each beam, and the user equipment periodically scans and probes the synchronization information by using each beam, so as to find an optimal sending and receiving beam pair. Because a requirement for a beam search delay before a user accesses a system is relatively low, the beam search delay may reach tens of or even hundreds of milliseconds. However, in the present application, in the quick beam search, a process of pairing beams between the base station and a specific user needs to be completed in a shorter time (within a few milliseconds).

Figure 5:
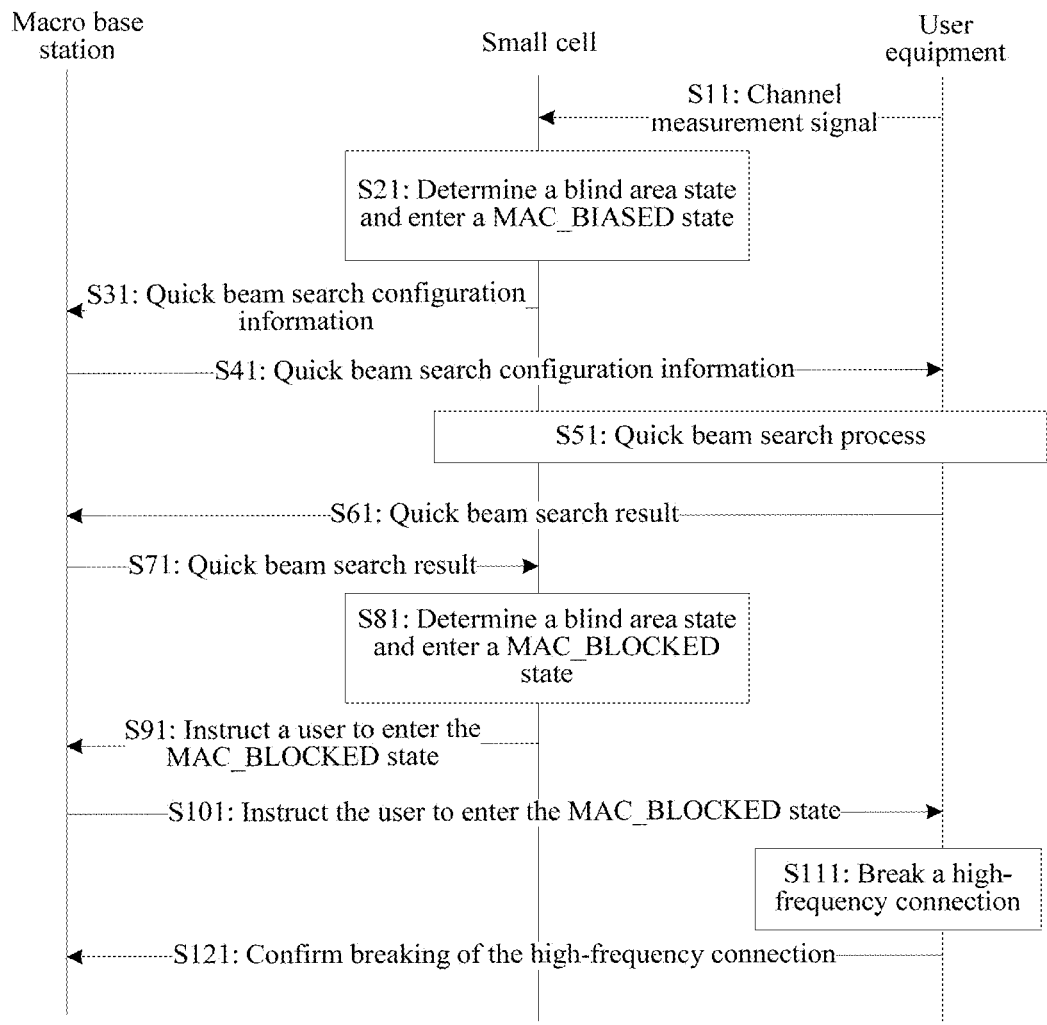
FIG. 5 is a flowchart of a blind area management method according to a first embodiment of the present application.
Figure 6:
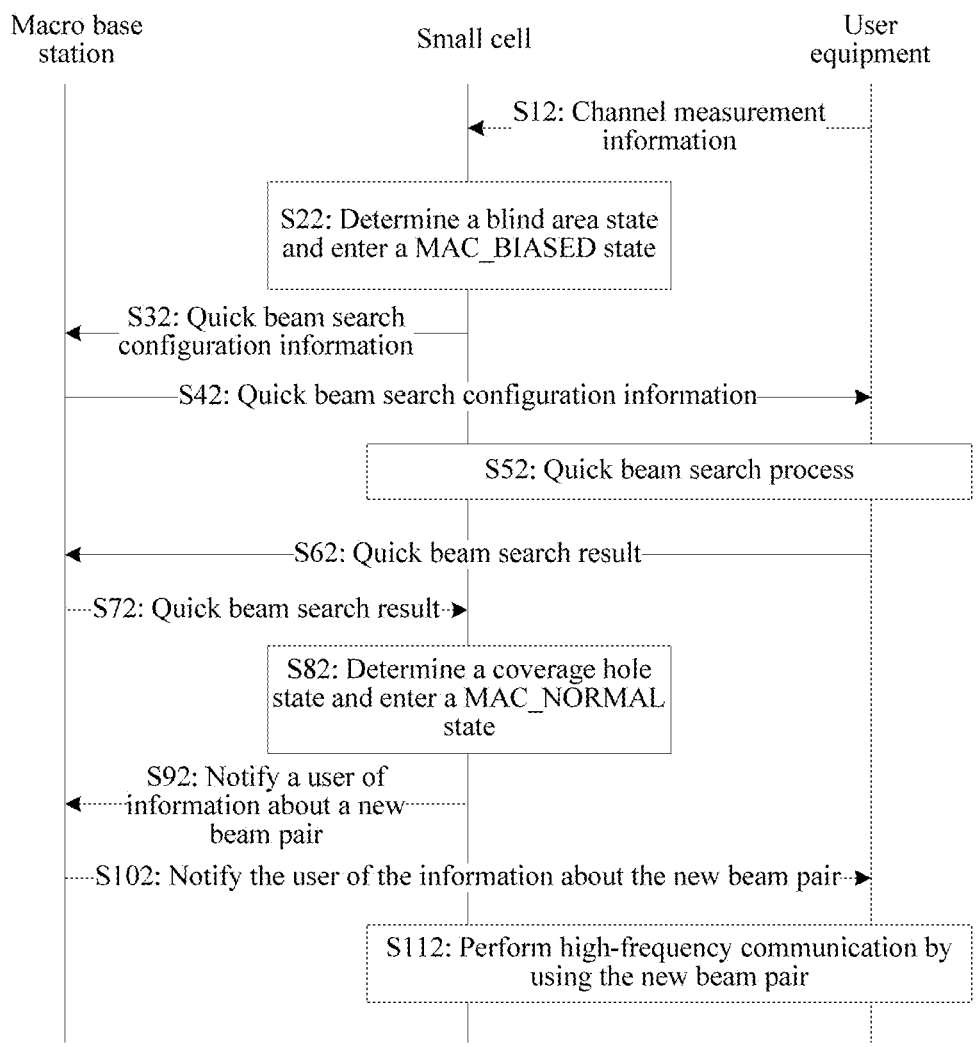
FIG. 6 is a flowchart of a blind area management method according to a second embodiment of the present application.

FIG. 5 and FIG. 6 are respectively specific flowcharts of blind area management methods in a first embodiment and a second embodiment. Small cells in FIG. 5 and FIG. 6 perform user plane data communication with user equipment by using a high frequency band (for example, a millimeter-wave band), and exchange control signaling with a macro base station by using a low frequency band (for example, a cellular band). The user equipment performs control plane data communication with the macro base station by using a low frequency band (for example, a cellular band).

In the embodiment shown in FIG. 5, a blind area management method applied to a high-frequency communications system includes the following steps.

S11: User equipment sends a channel measurement signal to a small cell by using a millimeter-wave band. The channel measurement signal may be a data signal or a reference signal sent by a user by using the millimeter-wave band, or ACK information fed back by a user by using the millimeter-wave band.

S21: The small cell detects the channel measurement signal sent by the user, calculates RSRP, a quantity of ACK packet loss times, and the like of the user equipment, and determines a blind area state of the user equipment according to the measurement information, and other information such as a location and a movement speed of the user equipment that are collected by the small cell. If the RSRP of the user equipment is relatively low (less than a preset threshold) and the movement speed is relatively high (greater than a preset speed threshold), it is determined that the user equipment is in a MAC_BIASED state, and a counting function of a MAC_BIASED state timer is enabled. After determining that the user equipment is in the MAC_BIASED state, the small cell needs to perform quick beam search.

S31: The small cell sends, to a macro base station by using a low frequency band or a high frequency band, quick beam search configuration information that is scheduled for the user equipment.

S41: After receiving the configuration information, the macro base station sends the quick beam search configuration information to the user equipment by using the low frequency band, where the quick beam search configuration information includes reference signaling configuration information, time-frequency resource information, beam sending sequence information, and the like required for the quick beam search.

S51: The small cell sends and the user equipment receives reference signaling in a specified sequence on a resource specified by the quick beam search configuration information, and performs a corresponding quick beam search process.

S61: The user equipment feeds back quick beam search result information to the macro base station by using the low frequency band, where the information includes information about whether there is a suitable new beam pair, beam pair information, and the like.

S71: The macro base station sends the quick beam search result information to the small cell by using the low frequency band or the high frequency band.

S81: If no suitable beam pair is found in a time that is set by the MAC_BIASED state timer, the small cell determines, according to the quick beam search result information, that the user equipment enters a MAC_BLOCKED state, and disables the counting function of the MAC_BIASED state timer.

S91: The small cell sends, to the macro base station by using the low frequency band or the high frequency band, information indicating that the user equipment enters the MAC_BLOCKED state.

S101: The macro base station instructs, by using the low frequency band, the user equipment to enter the MAC_BLOCKED state.

S111: After receiving information for instructing the user equipment to enter the MAC_BLOCKED state, the user equipment breaks a high-frequency connection of the user equipment.

S121: The user equipment sends information for confirming breaking of the high-frequency connection to the macro base station by using the low frequency band.

In the embodiment shown in FIG. 6, a blind area management method applied to a high-frequency communications system includes the following steps.

S12: User equipment sends a channel measurement signal to a small cell by using a millimeter-wave band. The channel measurement signal may be a data signal or a reference signal sent by a user by using the millimeter-wave band, or ACK information fed back by a user by using the millimeter-wave band.

S22: The small cell detects the channel measurement signal sent by the user equipment, calculates RSRP, a quantity of ACK packet loss times, and the like of the user equipment, and determines a blind area state of the user according to the measurement information, and other information such as a location and a movement speed of the user equipment that are collected by the small cell. If the RSRP of the user equipment is relatively low and the movement speed is relatively high, it is determined that the user equipment is in a MAC_BIASED state, and a counting function of a MAC_BIASED state timer is enabled.

S32: After determining that the user equipment is in the MAC_BIASED state, the small cell needs to perform quick beam search. The small cell sends, to a macro base station by using a low frequency band or a high frequency band, quick beam search configuration information that is scheduled for the user equipment.

S42: After receiving the configuration information, the macro base station sends the quick beam search configuration information to the user equipment by using the low frequency band, where the quick beam search configuration information includes reference signaling configuration information, time-frequency resource information, beam sending sequence information, and the like required for the quick beam search.

S52: The small cell sends and the user equipment receives reference signaling in a specified sequence on a resource specified by the quick beam search configuration information, and a corresponding quick beam search process is performed.

S62: The user equipment feeds back quick beam search result information to the macro base station by using the low frequency band, where the information includes information about whether there is a suitable new beam pair, beam pairing information, and the like.

S72: The macro base station sends the quick beam search result information to the small cell by using the low frequency band or the high frequency band.

S82: If a suitable new beam pair is found and the MAC_BIASED state timer does not time out, the small cell determines, according to the received result information, that the user enters a MAC_NORMAL state.

S92: The small cell sends information about the new beam pair that is found by means of the quick beam search to the macro base station by using the low frequency band or the high frequency band.

S102: The macro base station sends the information about the new beam pair to the user equipment by using the low frequency band.

S112: The small cell performs high-frequency communication with the user by using the new beam pair.

Figure 7:
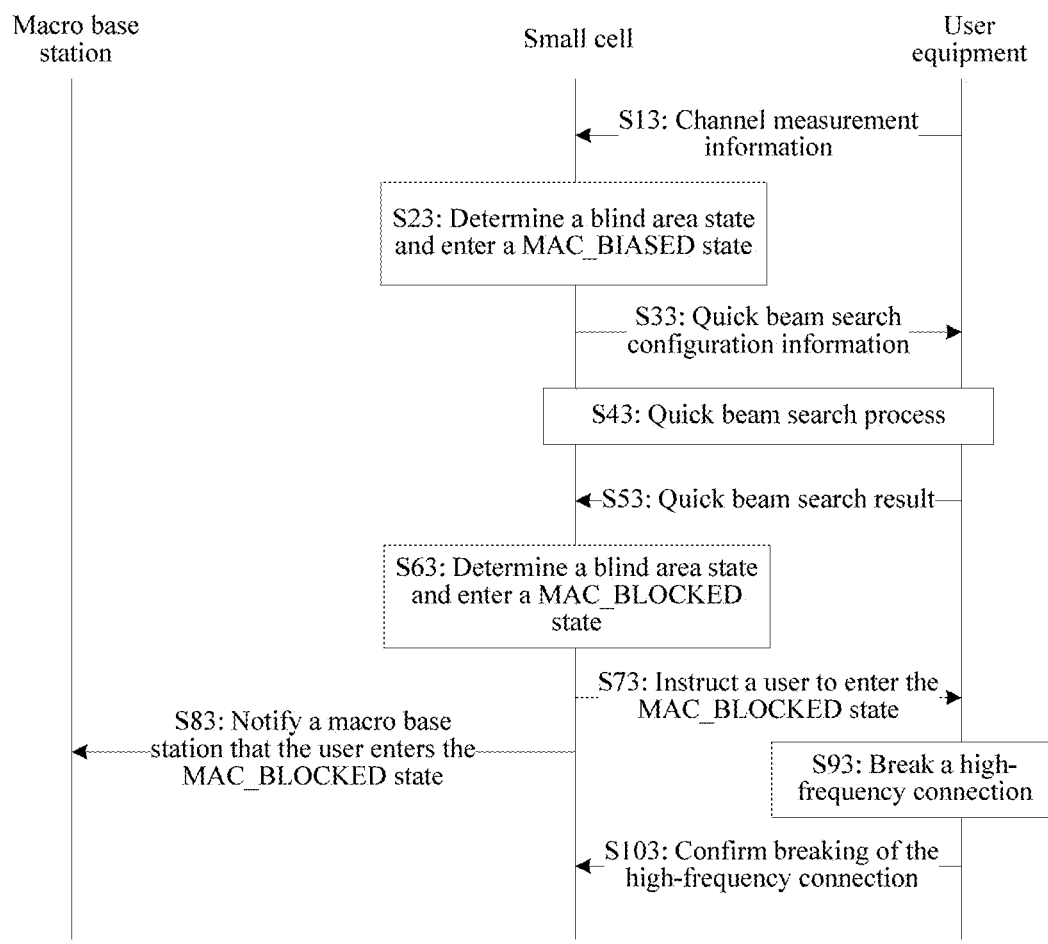
FIG. 7 is a flowchart of a blind area management method according to a third embodiment of the present application.
Figure 8:
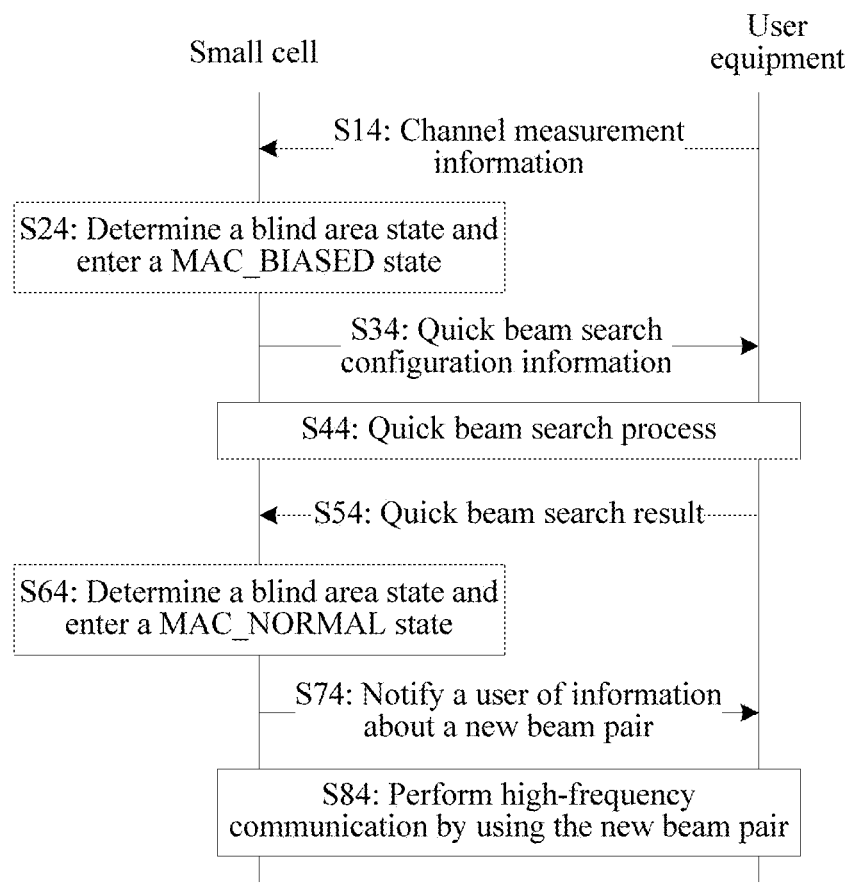
FIG. 8 is a flowchart of a blind area management method according to a fourth embodiment of the present application.

FIG. 7 and FIG. 8 are respectively specific flowcharts of blind area management methods in a third embodiment and a fourth embodiment. Small cells in FIG. 7 and FIG. 8 perform user plane data communication with user equipment by using a millimeter-wave band, and perform control plane data communication with a macro base station and the user equipment by using a cellular band.

In the embodiment shown in FIG. 7, a blind area management method applied to a high-frequency communications system includes the following steps.

S13: User equipment sends a channel measurement signal to a small cell by using a millimeter-wave band, where the channel measurement signal may be a data signal or a reference signal sent by a user by using the millimeter-wave band, or ACK/NACK information fed back by a user by using the millimeter-wave band.

S23: The small cell detects the channel measurement signal sent by the user, calculates RSRP, a quantity of ACK packet loss times, and the like of the user, and determines a blind area state of the user according to the measurement information, and other information such as a location and a movement speed of the user equipment that are collected by the small cell. If the RSRP of the user equipment is relatively low and the movement speed is relatively high, it is determined that the user equipment is in a MAC_BIASED state, and a counting function of a MAC_BIASED state timer is enabled.

S33: After determining that the user equipment is in the MAC_BIASED state, the small cell needs to perform quick beam search. The small cell sends quick beam search configuration information to the user equipment by using a low frequency band, where the quick beam search configuration information includes reference signaling configuration information, time-frequency resource information, beam sending sequence information, and the like required for the quick beam search.

S43: The small cell sends and the user equipment receives reference signaling in a specified sequence on a resource specified by the quick beam search configuration information, and a corresponding quick beam search process is performed.

S53: The user equipment sends quick beam search result information to the small cell by using the low frequency band.

S63: If no suitable new beam pair is found in a time predetermined by the MAC_BIASED state timer, the small cell determines, according to the received result information, that the user enters a MAC_BLOCKED state, and disables the counting function of the MAC_BIASED state timer.

S73: The small cell instructs, by using the low frequency band, the user equipment to enter the MAC_BLOCKED state.

S83: The small cell sends, to the macro base station by using the low frequency band or the high frequency band, information indicating that the user enters the MAC_BLOCKED state.

S93: After receiving information for instructing to enter the MAC_BLOCKED state, the user equipment breaks a high-frequency connection of the user equipment.

S103: The user equipment sends information for confirming breaking of the high-frequency connection to the small cell by using the low frequency band.

In the embodiment shown in FIG. 7, a blind area management method applied to a high-frequency communications system includes the following steps.

S14: User equipment sends a channel measurement signal to a small cell by using a millimeter-wave band, where the channel measurement signal may be a data signal or a reference signal sent by a user by using the millimeter-wave band, or ACK information fed back by a user by using the millimeter-wave band.

S24: The small cell detects the channel measurement signal sent by the user, calculates RSRP, a quantity of ACK packet loss times, and the like of the user, and determines a blind area state of the user according to the measurement information, and other information such as a location and a movement speed of the user equipment that are collected by the small cell. If the RSRP of the user equipment is relatively low and the movement speed is relatively high, it is determined that the user equipment is in a MAC_BIASED state, and a counting function of a MAC_BIASED state timer is enabled.

S34: After determining that the user equipment is in the MAC_BIASED state, the small cell needs to perform quick beam search. The small cell sends quick beam search configuration information to the user equipment by using a low frequency band, where the quick beam search configuration information includes reference signaling configuration information, time-frequency resource information, beam sending sequence information, and the like required for the quick beam search.

S44: The small cell sends and the user equipment receives reference signaling in a specified sequence on a resource specified by the quick beam search configuration information, and a corresponding quick beam search process is performed.

S54: The user equipment sends quick beam search result information to the small cell by using the low frequency band.

S64: If a suitable new beam pair is found within a time predetermined by the MAC_BIASED state timer, the small cell determines, according to the received result information, that the user can be converted to a MAC_NORMAL state.

S74: The small cell sends information about the new beam pair to the user equipment by using the low frequency band.

S84: The small cell performs high-frequency communication with the user by using the new beam pair.

Figure 9:
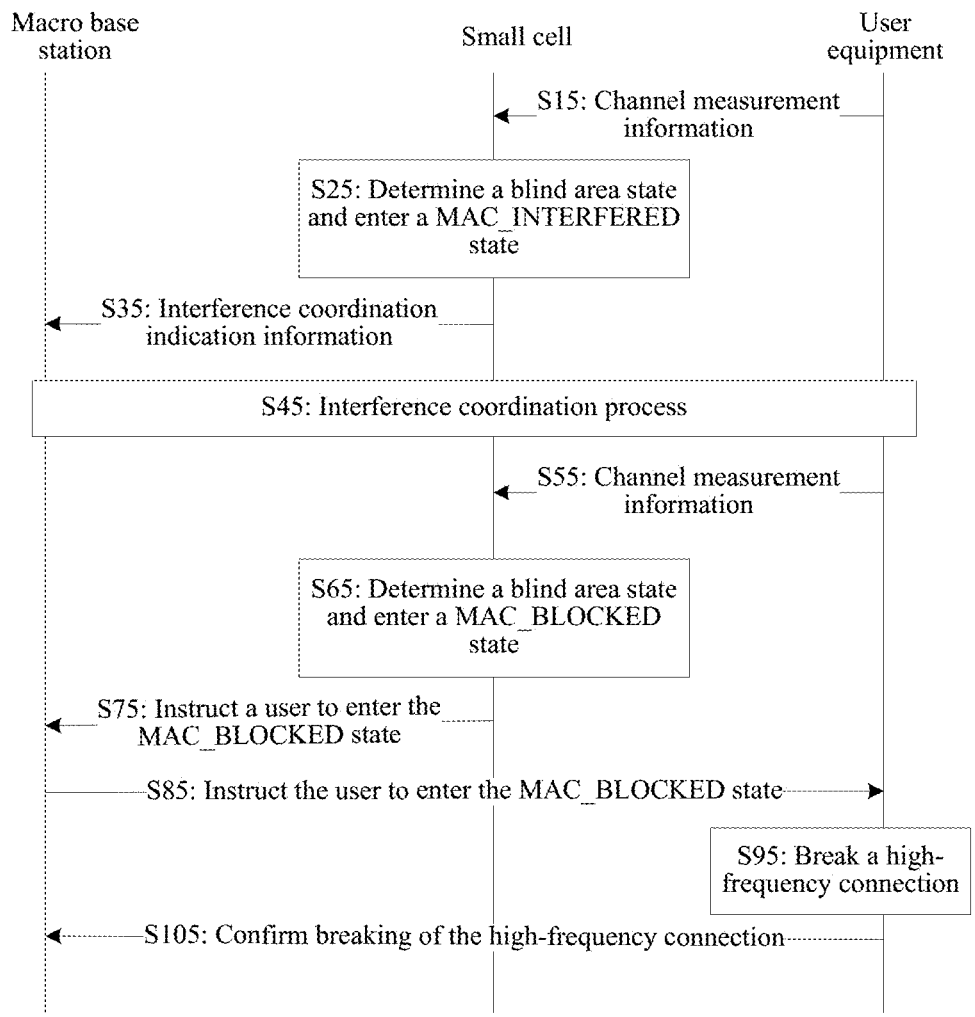
FIG. 9 is a flowchart of a blind area management method according to a fifth embodiment of the present application.
Figure 10:
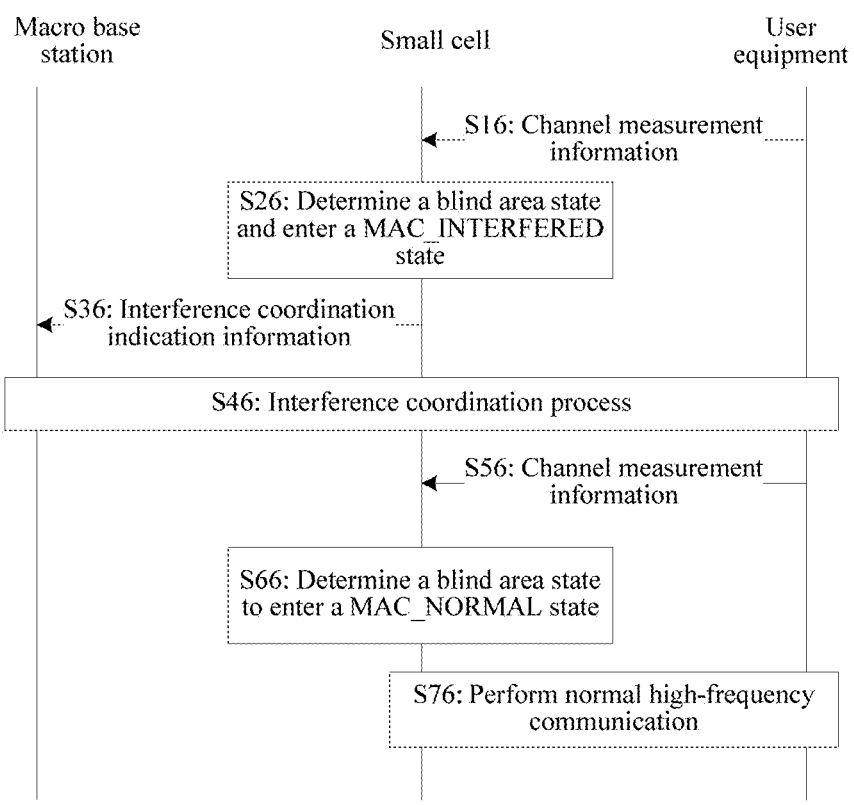
FIG. 10 is a flowchart of a blind area management method according to a sixth embodiment of the present application.
Figure 11:
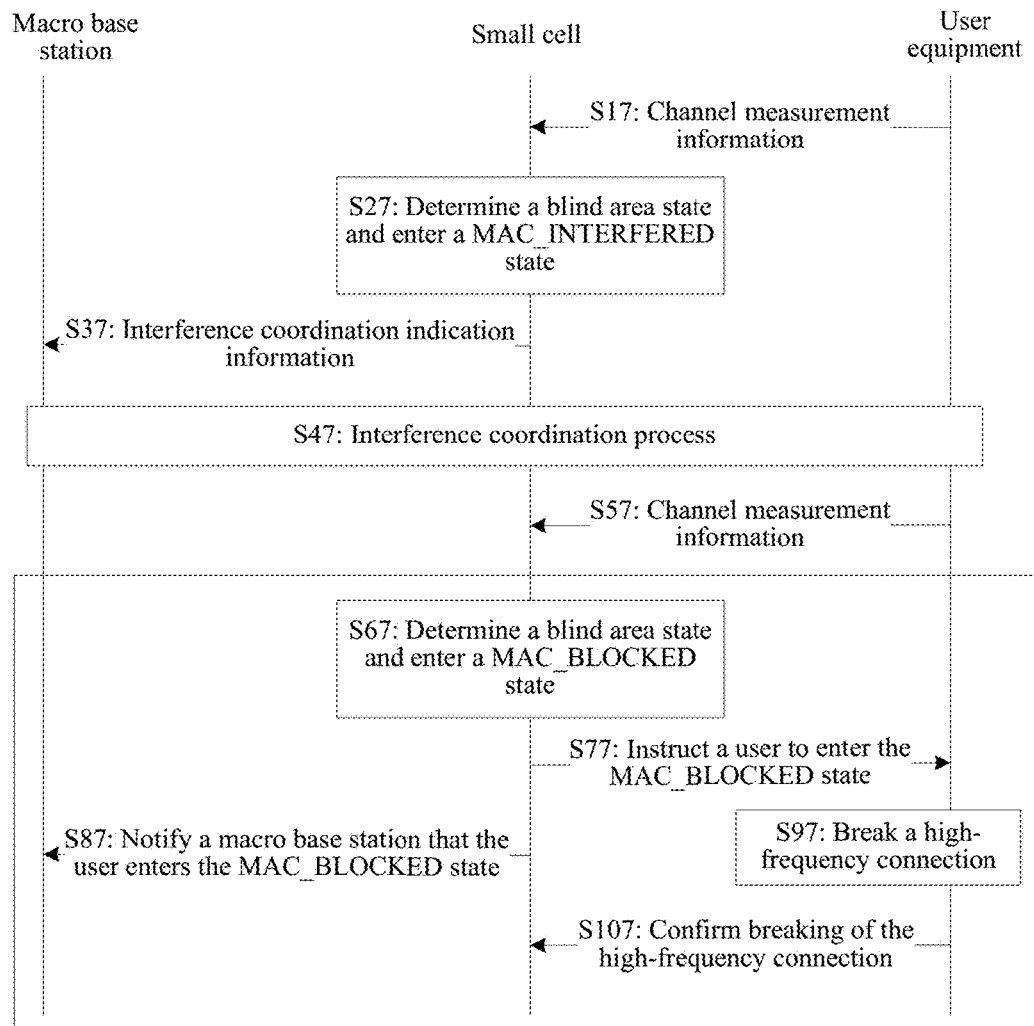
FIG. 11 is a flowchart of a blind area management method according to a seventh embodiment of the present application.

FIG. 9, FIG. 10, and FIG. 11 are respectively specific flowcharts of blind area management methods in a fifth embodiment, a sixth embodiment, and a seventh embodiment. Small cells in FIG. 9 and FIG. 10 perform user plane data communication with user equipment by using a millimeter-wave band, and exchange control signaling with a macro base station by using a conventional cellular band or a high frequency band. The user equipment performs control plane data communication with the macro base station by using the conventional cellular band. A small cell in FIG. 11 performs user plane data communication with the user equipment by using a millimeter-wave band, and performs control plane data communication with the macro base station and the user equipment by using the high frequency band or the conventional cellular band.

In the embodiment shown in FIG. 9, a blind area management method applied to a high-frequency communications system includes the following steps.

S15: User equipment sends a channel measurement signal to a small cell by using a millimeter-wave band, where the channel measurement signal may be a data signal or a reference signal sent by a user by using the millimeter-wave band, or ACK information fed back by a user by using the millimeter-wave band.

S25: The small cell detects the channel measurement signal sent by the user, calculates RSRP, RSRQ, a quantity of ACK packet loss times, and the like of the user equipment, and determines a blind area state of the user according to the measurement information, and other information such as a location and a movement speed of the user equipment that are collected by the small cell. If the RSRP of the user equipment is relatively high (greater than a corresponding RSRP threshold) and the RSRQ is relatively low (less than a corresponding RSRQ threshold), it may be determined that the user equipment is in a MAC_INTERFERED state, and a counting function of a MAC_INTERFERED state timer is enabled.

S35: After determining that the user equipment is in the MAC_INTERFERED state, the small cell needs to perform an interference coordination operation, and the small cell sends interference coordination request indication information to a macro base station by using a low frequency band or a high frequency band.

S45: After receiving the interference coordination request indication information, the macro base station performs an interference coordination operation with the small cell, a neighboring small cell, and the user equipment, for example, scheduling a radio resource with relatively little interference for the user equipment, where duration of the interference coordination operation may be set by the MAC_INTERFERED state timer.

S55: The user equipment sends a channel measurement signal to the small cell again by using the millimeter-wave band, where the channel measurement signal may be a data signal or a reference signal sent by the user by using the millimeter-wave band, or ACK information fed back by a user by using the millimeter-wave band.

S65: The small cell detects the channel measurement signal sent by the user, calculates RSRP, RSRQ, a quantity of ACK packet loss times, and the like of the user equipment, and determines a blind area state of the user according to the measurement information, and other information such as a location and a movement speed of the user equipment that are collected by the small cell. If the RSRP of the user equipment is relatively high and the RSRQ is relatively low, it may be determined that interference coordination is invalid, the user equipment is converted to a MAC_BLOCKED state, and the counting function of the MAC_INTERFERED state timer is disabled.

S75: The small cell sends, to the macro base station by using the low frequency band or the high frequency band, information indicating that the user enters the MAC_BLOCKED state.

S85: The macro base station instructs, by using the low frequency band, the user equipment to enter the MAC_BLOCKED state.

S95: After receiving information for instructing to enter the MAC_BLOCKED state, the user equipment breaks a high-frequency connection of the user equipment.

S105: The user equipment sends information for confirming breaking of the high-frequency connection to the macro base station by using the low frequency band.

In the embodiment shown in FIG. 10, a blind area management method applied to a high-frequency communications system includes the following steps.

S16: User equipment sends a channel measurement signal to a small cell by using a millimeter-wave band, where the channel measurement signal may be a data signal or a reference signal sent by a user by using the millimeter-wave band, or ACK information fed back by a user by using the millimeter-wave band.

S26: The small cell detects the channel measurement signal sent by the user, calculates RSRP, a quantity of ACK packet loss times, and the like of the user, and determines a blind area state of the user according to the measurement information, and other information such as a location and a movement speed of the user equipment that are collected by the small cell. If the RSRP of the user equipment is relatively high and the RSRQ is relatively low, it may be determined that the user equipment is in a MAC_INTERFERED state, and a counting function of a MAC_INTERFERED state timer is enabled.

S36: After determining that the user equipment is in the MAC_INTERFERED state, the small cell needs to perform an interference coordination operation. The small cell sends interference coordination request information to a macro base station by using a low frequency band or a high frequency band.

S46: After receiving the interference coordination request information, the macro base station performs an interference coordination operation with the small cell, a neighboring small cell, and the user equipment, for example, scheduling a radio resource with relatively little interference for the user equipment, where duration of the interference coordination operation may be set by the MAC_INTERFERED state timer.

S56: The user equipment sends a channel measurement signal to the small cell again by using the millimeter-wave band, where the channel measurement signal may be a data signal or a reference signal sent by the user by using the millimeter-wave band, or ACK information fed back by the user by using the millimeter-wave band.

S66: The small cell detects the channel measurement signal sent by the user, calculates RSRP, RSRQ, a quantity of ACK packet loss times, and the like of the user equipment, and determines a blind area state of the user according to the measurement information, and other information such as a location and a movement speed of the user equipment that are collected by the small cell. If the RSRP and the RSRQ of the user equipment are values in a normal range, it may be determined that interference coordination takes effect, the user equipment is converted to a MAC_NORMAL state, and the counting function of the MAC_INTERFERED state timer is disabled.

S76: The small cell performs normal data communication with the user equipment by using the millimeter-wave band.

In the embodiment shown in FIG. 11, a blind area management method applied to a high-frequency communications system includes the following steps.

S17: User equipment sends a channel measurement signal to a small cell by using a millimeter-wave band, where the channel measurement signal may be a data signal or a reference signal sent by a user by using the millimeter-wave band, or ACK information fed back by a user by using the millimeter-wave band.

S27: The small cell detects the channel measurement signal sent by the user, calculates RSRP, a quantity of ACK packet loss times, and the like of the user equipment, and determines a blind area state of the user according to the measurement information, and other information such as a location and a movement speed of the user equipment that are collected by the small cell. If the RSRP of the user equipment is relatively high and the RSRQ is relatively low, it may be determined that the user equipment is in a MAC_INTERFERED state, and a counting function of a MAC_INTERFERED state timer is enabled.

S37: After determining that the user equipment is in the MAC_INTERFERED state, the small cell needs to perform an interference coordination operation, and the small cell sends interference coordination request indication information to a macro base station by using a low frequency band or a high frequency band.

S47: After receiving the interference coordination request information, the macro base station performs an interference coordination operation with the small cell, a neighboring small cell, and the user equipment, for example, scheduling a radio resource with relatively little interference for the user equipment, where duration of the interference coordination operation may be set by the MAC_INTERFERED state timer.

S57: The user equipment sends a channel measurement signal to the small cell again by using the millimeter-wave band, where the channel measurement signal may be a data signal or a reference signal sent by the user by using the millimeter-wave band, or ACK information fed back by the user by using the millimeter-wave band.

S67: The small cell detects the channel measurement signal sent by the user, calculates RSRP, RSRQ, a quantity of ACK packet loss times, and the like of the user equipment, and determines a blind area state of the user according to the measurement information, and other information such as a location and a movement speed of the user equipment that are collected by the small cell. If the RSRP of the user equipment is relatively high and the RSRQ is relatively low, it may be determined that interference coordination is invalid, the user equipment is converted to a MAC_BLOCKED state, and the counting function of the MAC_INTERFERED state timer is disabled.

S77: The small cell instructs, by using the low frequency band, the user equipment to enter the MAC_BLOCKED state.

S87: The small cell notifies, by using the low frequency band or the high frequency band, the macro base station of information indicating that the user equipment enters the MAC_BLOCKED state.

S97: After receiving information for instructing to enter the MAC_BLOCKED state, the user equipment breaks a high-frequency connection of the user equipment.

S107: The user equipment sends information for confirming breaking of the high-frequency connection to the small cell by using the low frequency band.

Figure 12:
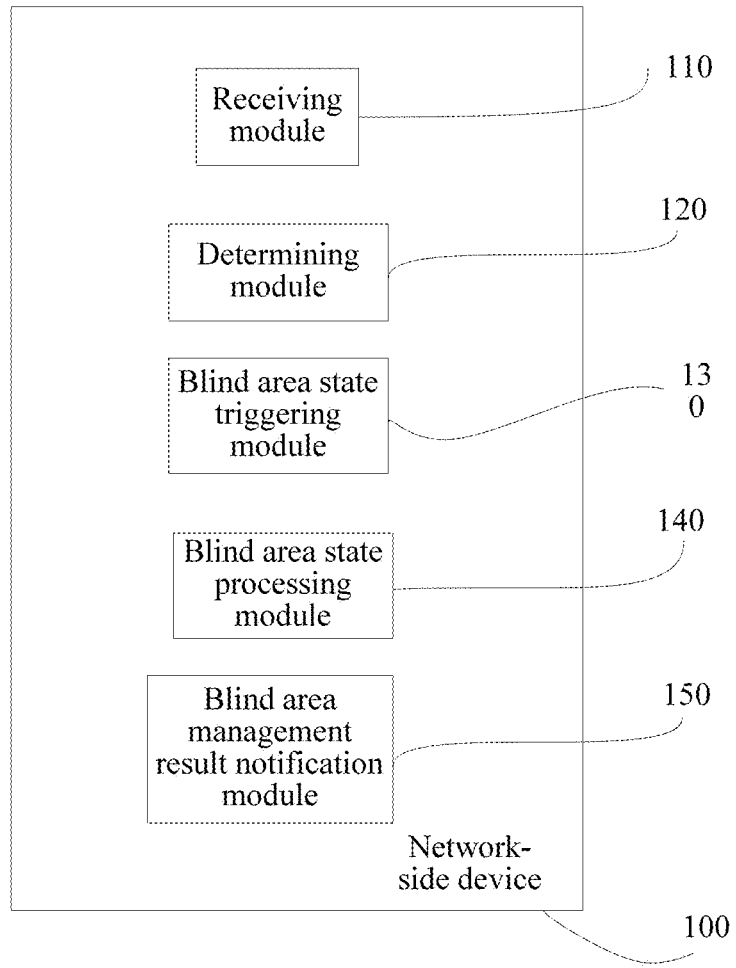
FIG. 12 is a module composition diagram of a network-side device according to an embodiment of the present application.

Referring to FIG. 12, in an implementation manner, a network-side device 100 in the foregoing high-frequency communications system specifically includes: a receiving module 110, a determining module 120, a blind area management triggering module 130, a blind area state processing module 140, and a blind area management result notification module 150.

The receiving module 110 is configured to receive measurement information sent by user equipment, where the measurement information includes information about the user equipment, such as RSRP, RSRQ, a movement speed, and an ACK/NACK.

The determining module 120 is configured to identify and determine a status of the user equipment according to the measurement information fed back by the user equipment, where the status of the user equipment is a normal communication state (MAC_NORMAL) or different blind area states, and the different blind area states include a beam biased state (MAC_BIASED), an interfered state (MAC_INTERFERED), and a blocked state (MAC_BLOCKED).

The blind area state processing module 140 is configured to: start a quick beam search process when the user equipment is in the beam biased state, so as to find a new beam pair capable of converting the user equipment to the normal communication state; or start an interference coordination process when the user equipment is in the interfered state, so as to schedule another high-frequency communication resource capable of reducing interference and converting the user equipment to the normal communication state; and if the status of the user equipment still cannot be converted to the normal communication state after the quick beam search process is started or the interference coordination process is started, convert the status of the user equipment to the blocked state; and when the user equipment is in the blocked state, instruct the user equipment to break a high-frequency connection and communicate with the network-side device by using a low frequency band. When the RSRP of the user equipment is greater than a preset RSRP threshold and an RSRQ value is less than a preset RSRQ threshold, the determining module 120 determines that the user equipment is in the interfered state.

When an RSRP value of the user equipment is less than a preset threshold and the movement speed is greater than a preset speed threshold, the determining module 120 determines that the user equipment is in the beam biased state.

When an RSRP value of the user equipment is less than a preset threshold, and it is detected, by means of quick beam search, that RSRP values received by the user equipment on all beams are less than the preset threshold, or it is determined, according to location information, that a link between the user equipment and a serving base station of the user equipment is blocked, the determining module 120 determines that the user equipment is in the blocked state.

The blind area management triggering module 130 is configured to: trigger blind area management when an RSRP value or an RSRQ value of the user equipment is decreased to a corresponding threshold, or trigger blind area management when detecting that the user equipment continuously loses an ACK character multiple times.

The blind area management result notification module 150 is configured to notify the user equipment of processing result information of the blind area state processing module, and the processing result information of the blind area state includes information about whether the user equipment is converted to the blocked state, information about whether a high-frequency connection is broke, and other information.

The network-side device 100 performs, by using a high frequency band, user plane data communication with the user equipment before the user equipment breaks the high-frequency connection, and the network-side device 100 performs control plane data communication with the user equipment by using a low frequency band.

Figure 13:
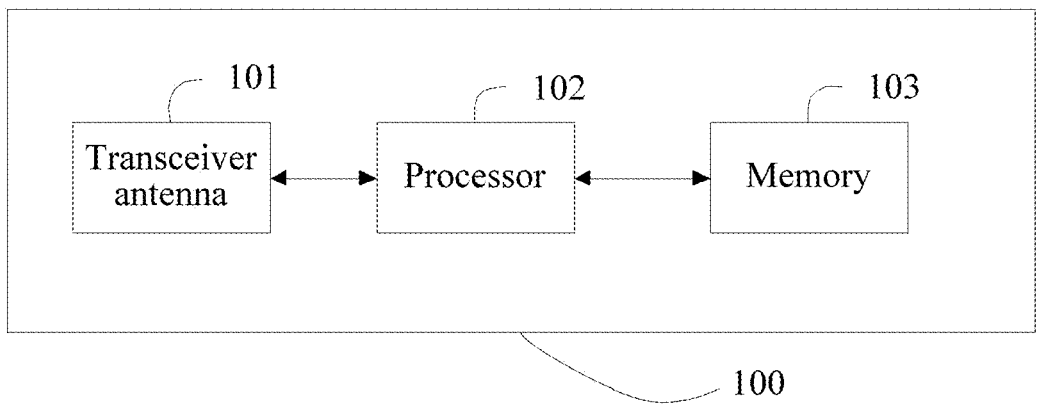
FIG. 13 is a composition diagram of a network-side device according to an embodiment of the present application.

FIG. 13 is a composition diagram of a network-side device according to another embodiment of the present application. The network-side device includes a transceiver antenna 101 used for signal sending and receiving, a processor 102, and a memory 103. In some implementation manners, the memory 103 stores a program related to blind area management, and the processor 102 can execute the program, to perform the operations of identifying and determining a status of user equipment according to measurement information fed back by the user equipment, where the status of the user equipment is a normal communication state (MAC_NORMAL) or different blind area states, and the different blind area states include a beam biased state (MAC_BIASED), an interfered state (MAC_INTERFERED), and a blocked state (MAC_BLOCKED), starting a quick beam search process when the user equipment is in the beam biased state, so as to find a new beam pair capable of converting the user equipment to the normal communication state; or starting an interference coordination process when the user equipment is in the interfered state, so as to schedule another high-frequency communication resource capable of reducing interference and converting the user equipment to the normal communication state, if the status of the user equipment still cannot be converted to the normal communication state after the quick beam search process is started or the interference coordination process is started, converting the status of the user equipment to the blocked state, and when the user equipment is in the blocked state, instructing the user equipment to break a high-frequency connection and communicate with the network-side device by using a low frequency band.

Figure 14:
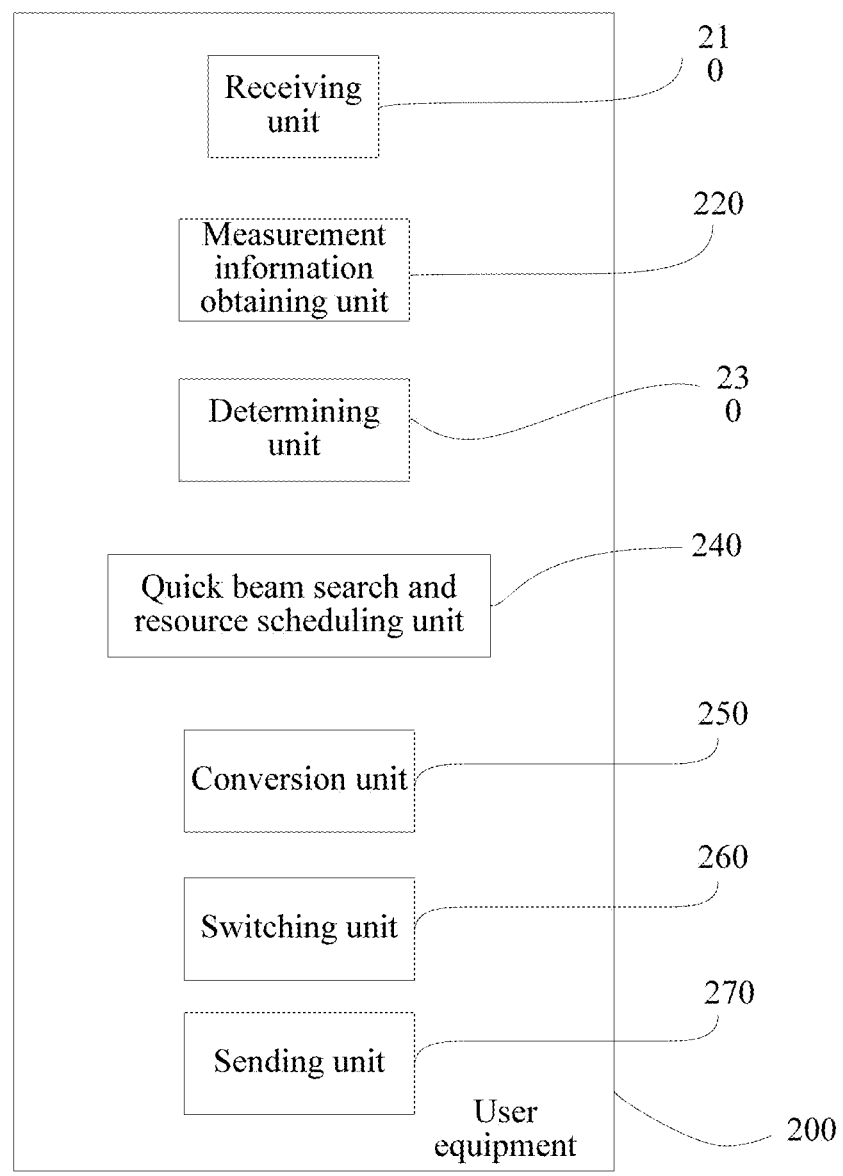
FIG. 14 is a module composition diagram of user equipment according to an embodiment of the present application.

Referring to FIG. 14, in an implementation manner, user equipment 200 specifically includes: a receiving unit 210, a measurement information obtaining unit 220, a determining unit 230, a quick beam search and resource scheduling unit 240, a conversion unit 250, a switching unit 260, and a sending unit 270.

The receiving unit 210 is configured to receive a signal that is sent by a network-side device 100 to the user equipment 200. The measurement information obtaining unit 220 is configured to obtain channel measurement information that is obtained when the user equipment performs data communication with the network-side device. The measurement information includes information about the user equipment, such as RSRP, an RSRQ value, a movement speed, and an ACK/NACK. The determining unit 230 is configured to identify and determine a status of the user equipment according to the measurement information. The status of the user equipment is a normal communication state or different blind area states, and the different blind area states include a beam biased state, an interfered state, and a blocked state. The quick beam search and resource scheduling unit 240 is configured to perform quick beam search when the user equipment is in the beam biased state, so as to find a new beam pair capable of converting the user equipment to the normal communication state; and is further configured to start an interference coordination process when the user equipment is in the interfered state, so as to schedule a high-frequency communication resource capable of reducing interference and converting the user equipment to the normal communication state. The conversion unit 250 is configured to: when the new beam pair converting the user equipment to the normal communication state is found within a preset time, convert the status of the user equipment from the beam biased state to the normal communication state, and when no new beam pair capable of converting the user equipment to the normal communication state is found within the preset time, convert the status of the user equipment from the beam biased state to the blocked state. The conversion unit 250 is further configured to: when the high-frequency communication resource capable of converting the user equipment to the normal communication state is found within a preset time, convert the status of the user equipment from the interfered state to the normal communication state, and when no high-frequency communication resource capable of converting the user equipment to the normal communication state is found within the preset time, convert the status of the user equipment from the interfered state to the blocked state. The switching unit 260 is configured to: when the user equipment is in the blocked state, break a high-frequency connection of the user equipment, and enable a low-frequency connection.

When the user equipment 200 is in the interfered state, the interference coordination process is started, so as to schedule the high-frequency communication resource capable of reducing interference and converting the user equipment to the normal communication state. If no high-frequency communication resource capable of converting the user equipment to the normal communication state is found within the preset time, the conversion unit 250 converts the status of the user equipment to the blocked state.

When the RSRP received by the user equipment 200 is greater than a preset RSRP threshold and the RSRQ value is less than a preset RSRQ threshold, the determining unit 230 determines that the user equipment is in the interfered state.

When an RSRP value of the user equipment 200 is less than a preset threshold and the movement speed is greater than a preset speed threshold, the determining unit 230 determines that the user equipment is in the beam biased state.

When an RSRP value of the user equipment is less than a preset threshold, and it is detected, by means of quick beam search, that RSRP values received by the user equipment on all beams are less than the preset threshold, or it is determined, according to location information, that a link between the user equipment and a serving base station of the user equipment is blocked, the determining unit 230 determines that the user equipment is in the blocked state.

The sending unit 270 is configured to: send the measurement information to the network-side device, and after the user equipment breaks a high-frequency connection, send information for confirming breaking of the high-frequency connection to the network-side device.

Figure 15:
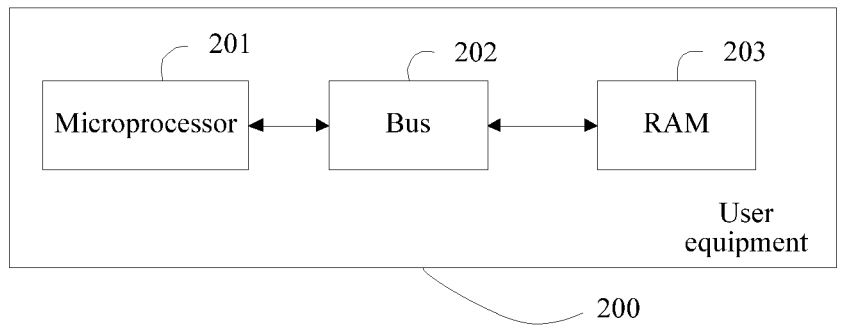
FIG. 15 is a composition diagram of user equipment according to an embodiment of the present application.

FIG. 15 is a composition diagram of user equipment according to another embodiment of the present application. The user equipment includes a microprocessor 201 used for signal sending and receiving, a bus 202, and a RAM (Random Access Memory, random access memory) 203. In some implementation manners, the RAM stores a program related to blind area management, and the microprocessor 201 can execute the program, to perform the operations of obtaining channel measurement information that is obtained when the user equipment performs data communication with a network-side device, where the measurement information includes information about the user equipment, such as RSRP, an RSRQ value, a movement speed, and an ACK/NACK, identifying and determining a status of the user equipment according to the measurement information, where the status of the user equipment is a normal communication state or different blind area states, and the different blind area states include a beam biased state, an interfered state, and a blocked state, performing quick beam search when the user equipment is in the beam biased state, so as to find a new beam pair capable of converting the user equipment to the normal communication state; and if the new beam pair capable of converting the user equipment to the normal communication state is found within a preset time, converting the status of the user equipment to the normal communication state; or if no new beam pair capable of converting the user equipment to the normal communication state is found within a preset time, converting the status of the user equipment to the blocked state; and when the user equipment is in the blocked state, breaking a high-frequency connection of the user equipment, and enabling a low-frequency connection, and, when the user equipment 200 is in the interfered state, starting an interference coordination process, so as to schedule a high-frequency communication resource capable of reducing interference and converting the user equipment to the normal communication state; and if no high-frequency communication resource capable of converting the user equipment to the normal communication state is found within a preset time, converting the status of the user equipment to the blocked state.

Embodiment 8

With reference to the foregoing embodiments of the present application, Embodiment 8 of the present application provides a network-side device 100 (shown in FIG. 12) that is capable of performing data communication with user equipment by using a high frequency band. The network-side device 100 includes a receiving module 110, configured to receive measurement information sent by the user equipment, a determining module 120, configured to identify a status of the user equipment according to the measurement information fed back by the user equipment, where the status of the user equipment is a normal communication state or a blind area state, and the blind area state includes at least one of a beam biased state, an interfered state, or a blocked state, and a blind area state processing module 140, configured to perform blind area management on the user equipment that is in the blind area state.

Specifically, the blind area state processing module 140 is configured to: when the status of the user equipment is the beam biased state, start a beam biasing timer, and perform a quick beam search process until the beam biasing timer times out or is stopped; if a new beam pair capable of converting the user equipment to the normal communication state is found in the quick beam search process, stop the beam biasing timer, and convert the status of the user equipment to a normal state; and if the beam biasing timer times out, convert the status of the user equipment to the blocked state.

Specifically, the blind area state processing module 140 is further configured to: when the status of the user equipment is the interfered state, start an interference coordination timer, and perform an interference coordination process until the interference coordination timer times out or is stopped; if a high-frequency communication resource capable of converting the user equipment to the normal communication state is found in the interference coordination process, stop the interference coordination timer, and convert the status of the user equipment to a normal state; and if the interference coordination timer times out, convert the status of the user equipment to the blocked state.

Specifically, the blind area state processing module 140 may be further configured to: when the status of the user equipment is the beam biased state, start a quick beam search process, so as to find the new beam pair capable of converting the user equipment to the normal communication state; and if no new beam pair capable of converting the user equipment to the normal communication state is found within a preset time, convert the status of the user equipment to the blocked state; or when the status of the user equipment is the interfered state, start an interference coordination process, so as to schedule another high-frequency communication resource capable of reducing interference and converting the user equipment to the normal communication state; and if no high-frequency communication resource capable of converting the user equipment to the normal communication state is found within a preset time, convert the status of the user equipment to the blocked state.

The blind area state processing module 140 may be further configured to: when the status of the user equipment is the blocked state, instruct the user equipment to enter the blocked state and break a high-frequency connection, so that the network-side device performs data communication with the user equipment by using a low frequency band.

Specifically, the measurement information includes RSRP, RSRQ, a movement speed, and ACK/NACK information of the user equipment.

When the RSRP of the user equipment is greater than a preset RSRP threshold and an RSRQ value is less than a preset RSRQ threshold, the determining module determines that the user equipment is in the interfered state.

When an RSRP value of the user equipment is less than a preset threshold and the movement speed is greater than a preset speed threshold, it is determined that the user equipment is in the beam biased state.

When an RSRP value of the user equipment is less than a preset threshold, and it is detected, by means of quick beam search, that RSRP values received by the user equipment on all beams are less than the preset threshold, or it is determined, according to location information, that a link between the user equipment and a serving base station of the user equipment is blocked, it is determined that the user equipment is in the blocked state.

The network-side device 100 further includes a blind area management triggering module 130, configured to: trigger blind area management when an RSRP value of the user equipment is less than a preset RSRP threshold or an RSRQ value is less than a preset RSRQ threshold; or trigger blind area management when detecting that the user equipment continuously loses an ACK character multiple times.

In this embodiment of the present application, the receiving module 110 of the network-side device 100 (shown in FIG. 12) may be a receiver, and functions of the determining module 120, the blind area management triggering module 130, and the blind area state processing module 140 may be integrated in a processor chip, and the blind area management result notification module 150 may be a transmitter.

Figure 16:
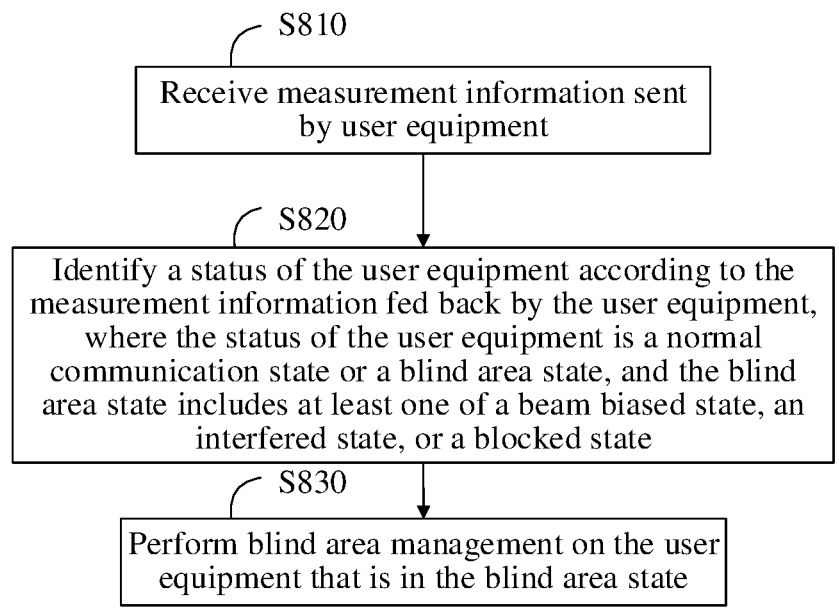
FIG. 16 is a flowchart of a blind area management method according to Embodiment 8 of the present application.

Referring to FIG. 16, Embodiment 8 of the present application further discloses a blind area management method that includes the following steps.

S810: Receive measurement information sent by user equipment.

S820: Identify a status of the user equipment according to the measurement information fed back by the user equipment, where the status of the user equipment is a normal communication state or a blind area state, and the blind area state includes at least one of a beam biased state, an interfered state, or a blocked state.

S830: Perform blind area management on the user equipment that is in the blind area state.

Specifically, the performing blind area management on the user equipment that is in the blind area state includes: when the status of the user equipment is the beam biased state, starting a beam biasing timer, and performing a quick beam search process until the beam biasing timer times out or is stopped; if a new beam pair capable of converting the user equipment to the normal communication state is found in the quick beam search process, stopping the beam biasing timer, and converting the status of the user equipment to the normal state; and if the beam biasing timer times out, converting the status of the user equipment to the blocked state.

Specifically, the performing blind area management on the user equipment that is in the blind area state includes: when the status of the user equipment is the interfered state, starting an interference coordination timer, and performing an interference coordination process until the interference coordination timer times out or is stopped; if a high-frequency communication resource capable of converting the user equipment to the normal communication state is found in the interference coordination process, stopping the interference coordination timer, and converting the status of the user equipment to the normal state; and if the interference coordination timer times out, converting the status of the user equipment to the blocked state.

Specifically, the performing blind area management on the user equipment that is in the blind area state may further include: when the status of the user equipment is the beam biased state, starting a quick beam search process, so as to find a new beam pair capable of converting the user equipment to the normal communication state; and if no new beam pair capable of converting the user equipment to the normal communication state is found within a preset time, converting the status of the user equipment to the blocked state, or when the status of the user equipment is the interfered state, starting an interference coordination process, so as to schedule another high-frequency communication resource capable of reducing interference and converting the user equipment to the normal communication state; and if no high-frequency communication resource capable of converting the user equipment to the normal communication state is found within a preset time, converting the status of the user equipment to the blocked state.

Specifically, when the status of the user equipment is the blocked state, the network-side device instructs the user equipment to enter the blocked state and break a high-frequency connection, so that the network-side device performs data communication with the user equipment by using a low frequency band.

Specifically, the measurement information includes RSRP, RSRQ, a movement speed, and ACK/NACK information of the user equipment.

When the RSRP of the user equipment is greater than a preset RSRP threshold and an RSRQ value is less than a preset RSRQ threshold, the determining module determines that the user equipment is in the interfered state.

When an RSRP value of the user equipment is less than a preset threshold and the movement speed is greater than a preset speed threshold, it is determined that the user equipment is in the beam biased state.

When an RSRP value of the user equipment is less than a preset threshold, and it is detected, by means of quick beam search, that RSRP values received by the user equipment on all beams are less than the preset threshold, or it is determined, according to location information, that a link between the user equipment and a serving base station of the user equipment is blocked, it is determined that the user equipment is in the blocked state.

Embodiment 9

Figure 17:
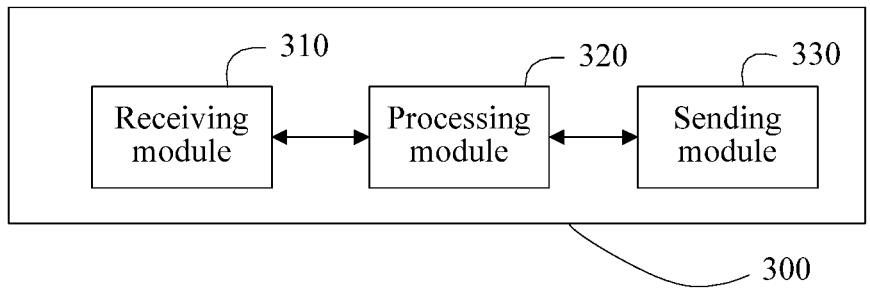
FIG. 17 is a module composition diagram of a network-side device according to Embodiment 9 of the present application.

Referring to FIG. 17, based on the foregoing embodiments of the present application, Embodiment 9 of the present application further provides a network-side device 300 that is capable of performing data communication with user equipment by using a high frequency band. The network-side device 300 includes a receiving module 310, configured to receive measurement information sent by the user equipment, and a processing module 320, configured to identify and determine, according to the measurement information fed back by the user equipment, whether to start a blind area management timer, where the blind area management timer includes at least one of a beam biasing timer or an interference coordination timer, and the processing module is further configured to perform, after the blind area management timer is started, blind area management on the user equipment that is in a blind area.

Specifically, the processing module 320 is configured to: after the beam biasing timer is started, perform quick beam search until the beam biasing timer times out or is stopped; and if a new beam pair capable of converting the user equipment to a normal communication state is found in a quick beam search process, stop the beam biasing timer.

The network-side device 300 further includes a sending module 330 that may be configured to: after the beam biasing timer is started, send quick beam search configuration information to the user equipment. The quick beam search configuration information includes at least one of the following information: reference signaling configuration information, time-frequency resource information, or beam sending sequence information required for the quick beam search.

Specifically, the processing module 320 may be further configured to: after the interference coordination timer is started, perform an interference coordination process until the interference coordination timer times out or is stopped; and if a high-frequency communication resource capable of converting the user equipment to the normal communication state is found in the interference coordination process, stop the interference coordination timer.

Specifically, if the beam biasing timer or the interference coordination timer times out, the network-side device 300 instructs the user equipment to break a high-frequency connection, so that the network-side device performs data communication with the user equipment by using a low frequency band.

In this embodiment of the present application, the receiving module 310 of the network-side device 300 (shown in FIG. 17) may be a receiver, functions of the processing module 320 may be integrated in a processor chip, and the sending module 330 may be a transmitter.

Figure 18:
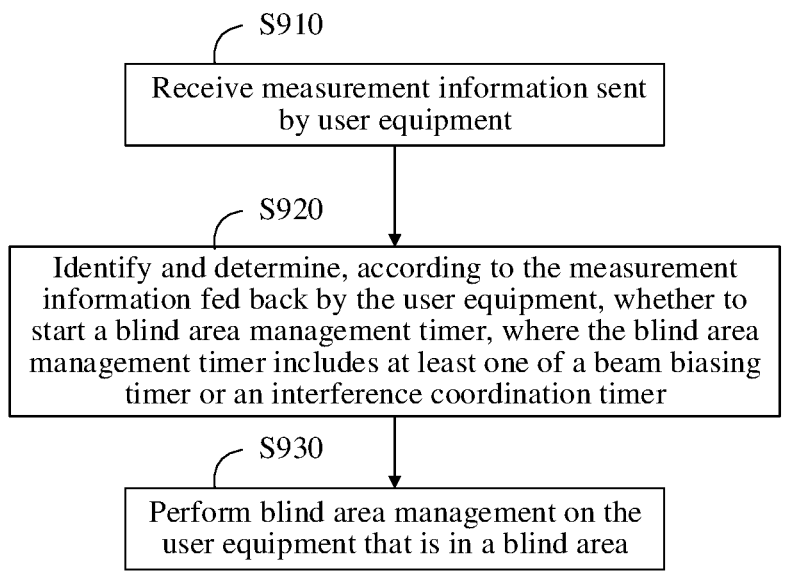
FIG. 18 is a flowchart of a blind area management method according to Embodiment 9 of the present application.

Referring to FIG. 18, Embodiment 9 of the present application further discloses a blind area management method that includes the following steps.

S910: Receive measurement information sent by user equipment.

S920: Identify and determine, according to the measurement information fed back by the user equipment, whether to start a blind area management timer, where the blind area management timer includes at least one of a beam biasing timer or an interference coordination timer.

S930: Perform blind area management on the user equipment that is in a blind area.

Specifically, the performing blind area management on the user equipment that is in a blind area includes: after the beam biasing timer is started, performing quick beam search until the beam biasing timer times out or is stopped; and if a new beam pair capable of converting the user equipment to a normal communication state is found in a quick beam search process, stopping the beam biasing timer.

Specifically, the performing blind area management on the user equipment that is in a blind area further includes: after the beam biasing timer is started, sending, by the network-side device, quick beam search configuration information to the user equipment, where the quick beam search configuration information includes at least one of the following information: reference signaling configuration information, time-frequency resource information, or beam sending sequence information required for the quick beam search.

Specifically, the performing blind area management on the user equipment that is in a blind area includes: after the interference coordination timer is started, performing an interference coordination process until the interference coordination timer times out or is stopped; and if a high-frequency communication resource capable of converting the user equipment to a normal communication state is found in the interference coordination process, stopping the interference coordination timer.

Specifically, if the beam biasing timer or the interference coordination timer times out, the user equipment is instructed to break a high-frequency connection, so that the network-side device performs data communication with the user equipment by using a low frequency band.

Embodiment 10

Figure 19:
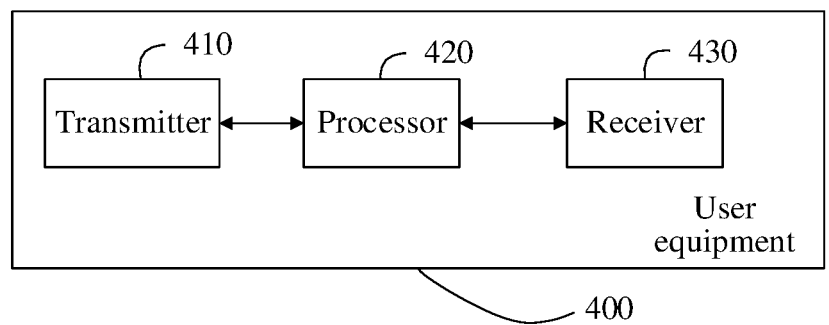
FIG. 19 is a composition diagram of user equipment according to Embodiment 10 of the present application.

Referring to FIG. 19, based on the foregoing embodiments, Embodiment 10 of the present application further discloses user equipment 400 that is capable of performing data communication with a network-side device by using a high frequency band or a low frequency band. The user equipment 400 includes a processor 420, configured to obtain measurement information that is obtained when the user equipment performs data communication with the network-side device, a transmitter 410, configured to send the measurement information to the network-side device, so that the network-side device determines a status of the user equipment, where the status of the user equipment is a normal communication state or a blind area state, and the different blind area states include at least one of a beam biased state, an interfered state, or a blocked state, and a receiver 430, configured to receive blind area management information sent by the network-side device.

Specifically, the measurement information includes RSRP, an RSRQ value, a movement speed, and ACK/NACK information of the user equipment.

When the RSRP of the user equipment is greater than a preset RSRP threshold and the RSRQ value is less than a preset RSRQ threshold, the user equipment is in the interfered state.

When an RSRP value of the user equipment is less than a preset threshold and/or the movement speed is greater than a preset speed threshold, the user equipment is in the beam biased state.

When an RSRP value of the user equipment is less than a preset threshold, and it is detected, by means of quick beam search, that RSRP values received by the user equipment on all beams are less than the preset threshold, or it is determined, according to location information, that a link between the user equipment and a serving base station of the user equipment is blocked, the user equipment is in the blocked state.

Specifically, the blind area management information includes high-frequency communication resource allocation information used for enabling the user equipment in the blind area state to restore normal high-frequency communication, or notification information used for breaking a high-frequency connection.

According to the present application, the foregoing blind area management methods are used in a high-frequency communications system, so that whether user equipment enters a blind area and a blind area state of the user equipment can be determined quickly, and a corresponding optimization operation is performed according to a corresponding blind area state. Therefore, the user equipment can quickly restore normal communication, a disruption probability is reduced, and communication quality is ensured.

The foregoing descriptions are merely specific implementation manners of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A network-side device, comprising:
a receiving module, configured to receive measurement information from a user equipment, wherein the measurement information comprises at least one of a reference signal receiver power (RSRP), a reference signal receiver quality (RSRQ), a movement speed, or acknowledgement/non-acknowledgement (ACK/NACK) information of the user equipment;
a processor; and
a non-transitory computer-readable storage medium storing a program to be executed by the processor, the program including instructions to:
identify a status of the user equipment according to the measurement information received from the user equipment, wherein the status of the user equipment is a normal communication state or a blind area state, and wherein identifying the status of the user equipment comprises identifying, in response to the status of the user equipment being the blind area state, a blind area state type, wherein the blind area state type is one of a beam biased state, an interfered state, or a blocked state, and wherein the instructions to identify the status of the user equipment include instructions to determine that the user equipment is in the blind area state and that the blind area state type is the beam biased state when an RSRP value of the user equipment is less than a preset threshold and the movement speed is greater than a preset speed threshold; and
perform blind area management of the user equipment when the user equipment is in the blind area state and according to the blind state area type.

2. The network-side device according to claim 1, wherein the instructions to perform blind area management include instructions to:
start a beam biasing timer when the status of the user equipment is the blind area state and the blind area state type is the beam biased state, and perform a quick beam search process until the beam biasing timer times out or is stopped.

3. The network-side device according to claim 2, wherein the instructions to perform blind area management further include instructions to:
stop the beam biasing timer in response to a new beam pair capable of converting the user equipment to the normal communication state being found by the quick beam search process, and convert the status of the user equipment to the normal communication state; and
convert the status of the user equipment to the blind area state and the blind area state type to the blocked state in response to the beam biasing timer timing out.

4. The network-side device according to claim 1, wherein the instructions to perform blind area management include instructions to:
start an interference coordination timer in response to the blind area state type being the interfered state, and perform an interference coordination process until the interference coordination timer times out or is stopped.

5. The network-side device according to claim 4, wherein the instructions to perform blind area management further include instructions to:
stop the interference coordination timer in response to a high-frequency communication resource capable of converting the user equipment to the normal communication state being found by the interference coordination process, and convert the status of the user equipment to the normal state; and
convert the status of the user equipment to the blind area state and the blind area state type to the blocked state in response to the interference coordination timer timing out.

6. The network-side device according to claim 1, wherein the instructions to perform blind area management include instructions to:
start a quick beam search process in response to the blind area state type being the beam biased state, so as to find a new beam pair capable of converting the user equipment to the normal communication state, and convert the status of the user equipment to the blind area state and the blind area state type to the blocked state in response to failing to find, within a preset time, a new beam pair capable of converting the user equipment to the normal communication state; and
start an interference coordination process in response to the blind area state type being the interfered state, so as to schedule another high-frequency communication resource capable of reducing interference and converting the user equipment to the normal communication state, and convert the status of the user equipment to the blind area state and the blind area state type to the blocked state in response to failing to find, within a preset time, a high-frequency communication resource capable of converting the user equipment to the normal communication state.

7. The network-side device according to claim 1, wherein the instructions to perform blind area management include instructions to:
instruct the user equipment to break a high-frequency connection in response to the blind area state type being the blocked state, so that the network-side device performs data communication with the user equipment by using a low frequency band.

8. The network-side device according to claim 7, wherein the instructions to perform blind area management further include instructions to:
instruct the user equipment to enter the blind area state and the blind area state type to be the blocked state when the network-side device converts the blind area state type to the blocked state.

9. The network-side device according to claim 1, wherein the blind area state type is the interfered state when the RSRP of the user equipment is greater than a preset RSRP threshold and an RSRQ value is less than a preset RSRQ threshold.

10. The network-side device according to claim 1, wherein the program further includes instructions to determine that the user equipment is in the blind area state and the blind area state type is the blocked state when an RSRP value of the user equipment is less than a preset threshold and when it is detected, by a quick beam search, that RSRP values received by the user equipment on all beams are less than the preset threshold, or when it is determined, according to location information, that a link between the user equipment and a serving base station of the user equipment is blocked.

11. The network-side device according to claim 1, wherein the program further includes instructions to:
trigger blind area management when a RSRP value of the user equipment is less than a preset RSRP threshold or a RSRQ value is less than a preset RSRQ threshold, and
trigger blind area management when detecting that the user equipment continuously loses an ACK character multiple times.

12. A terminal comprising:
a processor;
a non-transitory computer-readable storage medium storing a program to be executed by the processor, the program including instructions to:
obtain measurement information when the terminal performs data communication with a network-side device, wherein the measurement information comprises at least one of a reference signal receiver power (RSRP), a reference signal receiver quality (RSRQ) value, a movement speed, or acknowledgement/non-acknowledgement (ACK/NACK) information of the terminal;
a transmitter, configured to send the measurement information to the network-side device, so that the network-side device determines a status of a user equipment, wherein the status of the user equipment is a normal communication state or a blind area state, wherein the network-side device identifies, in response to the status of the user equipment being in the blind area state, a blind area state type, and wherein the blind area state type is one of a beam biased state, an interfered state, or a blocked state, wherein the terminal is in the blind area state and the blind area state type is the beam biased state when an RSRP value of the terminal is less than a preset threshold and the movement speed is greater than a preset speed threshold; and
a receiver, configured to receive blind area management information sent by the network-side device according to the blind area state type.

13. The terminal according to claim 12, wherein the terminal is in the blind area state and the blind area state type is the interfered state when the RSRP of the terminal is greater than a preset RSRP threshold and the RSRQ value is less than a preset RSRQ threshold.

14. The terminal according to claim 13, wherein the blind area management information comprises high-frequency communication resource allocation information enabling the terminal in the blind area state to restore normal high-frequency communication, or notification information used for breaking a high-frequency connection.

15. The terminal according to claim 12, wherein the terminal is in the blind area state and the blind area state type is the blocked state when an RSRP value of the terminal is less than a preset threshold and when it is detected, by means of quick beam search, that RSRP values received by the terminal on all beams are less than the preset threshold, or when it is determined, according to location information, that a link between the terminal and a serving base station of the terminal is blocked.

16. A method comprising:
receiving measurement information from a user equipment, wherein the measurement information comprises at least one of a reference signal receiver power (RSRP), a reference signal receiver quality (RSRQ)

value, a movement speed, or acknowledgement/non-acknowledgement (ACK/NACK) information of the user equipment;
identifying a status of the user equipment according to the measurement information received from the user equipment, wherein the status of the user equipment is a normal communication state or a blind area state, and wherein the identifying the status of the user equipment comprises identifying, in response to the status of the user equipment being the blind area state, a blind area state type, wherein the blind area state type is one of a beam biased state, an interfered state, or a blocked state, wherein the identifying the blind area state type comprises determining that the blind area state type is the beam biased state when an RSRP value of the user equipment is less than a preset threshold and the movement speed is greater than a preset speed threshold; and
performing blind area management of the user equipment when the user equipment is in the blind area state and according to the blind state area type.

17. The method of claim 16, further comprising:
starting a beam biasing timer in response to the status of the user equipment being the blind area state and the blind area state type being the beam biased state; and
performing a quick beam search process until the beam biasing timer times out or is stopped.

18. The method of claim 17, further comprising:
stopping the beam biasing timer in response to a new beam pair capable of converting the user equipment to the normal communication state being found by the quick beam search process, and converting the status of the user equipment to the normal communication state; and
converting the status of the user equipment to the blind area state and the blind area state type to the blocked state in response to the beam biasing timer timing out.

19. The method of claim 16, further comprising:
starting an interference coordination timer in response to the blind area state type being the interfered state; and
performing an interference coordination process until the interference coordination timer times out or is stopped.

20. The method of claim 19, further comprising:
stopping the interference coordination timer in response to a high-frequency communication resource capable of converting the user equipment to the normal communication state being found by the interference coordination process, and converting the status of the user equipment to the normal state; and
converting the status of the user equipment to the blind area state and the blind area state type to the blocked state in response to the interference coordination timer timing out.

21. The method of claim 16, further comprising:
starting a quick beam search process when the status of the user equipment is the beam biased state, so as to find a new beam pair capable of converting the user equipment to the normal communication state, and converting the status of the user equipment to the blind area state and the blind area state type to the blocked state in response to failing to find, within a preset time, a new beam pair capable of converting the user equipment to the normal communication state; and
starting an interference coordination process in response to the blind area state type being the interfered state, so as to schedule another high-frequency communication resource capable of reducing interference and converting the user equipment to the normal communication state, and converting the status of the user equipment to the blind area state and the blind area state type to the blocked state in response to failing to find, within a preset time, a high-frequency communication resource capable of converting the user equipment to the normal communication state.

22. The method of claim 16, further comprising:
instructing the user equipment to break a high-frequency connection in response to the blind area state type being the blocked state, so that a network-side device performs data communication with the user equipment by using a low frequency band.

23. The method of claim 22, further comprising:
instructing the user equipment to enter the blind area state with the blind area state type being the blocked state when the network-side device converts the blind area state type to the blocked state.

24. The method claim 16, further comprising determining that the blind area state type is the interfered state when the RSRP of the user equipment is greater than a preset RSRP threshold and an RSRQ value is less than a preset RSRQ threshold.

25. The method of claim 16, further comprising determining that the blind area state type is the blocked state when an RSRP value of the user equipment is less than a preset threshold and when it is detected, by a quick beam search, that RSRP values received by the user equipment on all beams are less than the preset threshold, or when it is determined, according to location information, that a link between the user equipment and a serving base station of the user equipment is blocked.

26. The method of claim 16, further comprising:
triggering blind area management when an RSRP value of the user equipment is less than a preset RSRP threshold or an RSRQ value is less than a preset RSRQ threshold; and
triggering blind area management when detecting that the user equipment continuously loses an ACK character multiple times.

* * * * *